(12) United States Patent
Malamut et al.

(10) Patent No.: US 10,600,121 B1
(45) Date of Patent: Mar. 24, 2020

(54) FORECASTING TRADING ALGORITHM PERFORMANCE

(71) Applicant: Liquidnet Holdings, Inc., New York, NY (US)

(72) Inventors: Roberto Malamut, Astoria, NY (US); Neerav Shah, Rutherford, NJ (US)

(73) Assignee: Liquidnet Holdings, Inc., New York, NY (US)

( * ) Notice: Subject to any disclaimer, the term of this patent is extended or adjusted under 35 U.S.C. 154(b) by 518 days.

(21) Appl. No.: 15/198,695

(22) Filed: Jun. 30, 2016

Related U.S. Application Data

(60) Provisional application No. 62/187,552, filed on Jul. 1, 2015.

(51) Int. Cl.
*G06Q 40/04* (2012.01)

(52) U.S. Cl.
CPC .................................... *G06Q 40/04* (2013.01)

(58) Field of Classification Search
USPC .............................................. 705/35, 37, 38
See application file for complete search history.

(56) References Cited

U.S. PATENT DOCUMENTS

| | | | |
|---|---|---|---|
| 6,766,304 B2 | 7/2004 | Kemp, II et al. | |
| 7,870,062 B2 * | 1/2011 | Waelbroeck | G06Q 40/00 705/37 |
| 7,882,015 B2 | 2/2011 | Waelbroeck et al. | |
| 7,908,203 B2 * | 3/2011 | Shapiro | G06Q 40/00 705/37 |
| 8,095,455 B2 * | 1/2012 | Shapiro | G06Q 40/00 705/35 |
| 8,577,787 B1 * | 11/2013 | Gastineau | G06Q 40/06 705/37 |
| 8,738,502 B2 * | 5/2014 | Domowitz | G06Q 40/04 705/36 R |
| 2008/0040255 A1 * | 2/2008 | Shapiro | G06Q 40/025 705/37 |
| 2009/0254473 A1 * | 10/2009 | Waelbroeck | G06Q 40/00 705/37 |
| 2010/0211496 A1 * | 8/2010 | Cottrell | G06Q 40/00 705/37 |

(Continued)

*Primary Examiner* — Samica L Norman
*Assistant Examiner* — Murali K Dega
(74) *Attorney, Agent, or Firm* — Westman, Champlin & Koehler, P.A.

(57) ABSTRACT

In a method of placing a security trade order using a trading algorithm in a computerized trading system, candidate order characteristics of a candidate order are received through a first GUI, and current market characteristics are obtained. Performance and fill rate scores are forecasted for executions of the candidate order by each of a plurality of trading algorithms using a ranking model based on historical data for a plurality of orders previously-executed via one or more of the plurality of trading algorithms, the candidate order characteristics and the current market characteristics. Each of the plurality of trading algorithms are ranked for the candidate order. A highest ranked trading algorithm is selected and is displayed on a second GUI. A selection of one of the displayed highest ranked trading algorithm is received from a user, and the candidate order is placed using the selected trading algorithm.

18 Claims, 11 Drawing Sheets

(56) References Cited

U.S. PATENT DOCUMENTS

| | | | |
|---|---|---|---|
| 2011/0161222 A1* | 6/2011 | Shapiro | G06Q 40/00 |
| | | | 705/37 |
| 2015/0120524 A1 | 4/2015 | Domowitz et al. | |
| 2018/0232806 A1* | 8/2018 | Teng | G06Q 40/06 |

* cited by examiner

| Bin | midPoint |
|-----|----------|
| 1   | -42.4    |
| 2   | -14.9    |
| 3   | -3.1     |
| 4   | 8.6      |
| 5   | 20.4     |
| 6   | 32.2     |
| 7   | 44.0     |
| 8   | 55.8     |
| 9   | 67.5     |
| 10  | 113.2    |

FORECASTING TRADING ALGORITHM PERFORMANCE

CROSS-REFERENCE TO RELATED APPLICATION

The present application is based on and claims the benefit of U.S. provisional patent application Ser. No. 62/187,552, filed Jul. 1, 2015, the content of which is hereby incorporated by reference in its entirety.

FIELD

Embodiments of the present disclosure are generally related to electronic trading systems. More particularly, some embodiments of the present disclosure relate to methods, systems and computer program products for forecasting the performance of different trading algorithms based on historical trade data and other factors.

BACKGROUND

Electronic (i.e., computer-based) trading systems, such as execution management systems, are trade tools that are used to create and execute trade orders on behalf of traders. Electronic trading systems are known to utilize trading algorithms as a lower cost and theoretically more efficient way to cope with various market inefficiencies and predatory trading behaviors. Such trading algorithms are typically designed to analyze market data, identify liquidity opportunities, and arrive at intelligent trading decisions. However, trading situations are often too complex or fast-paced for a trader to confidently determine the optimal type of trading algorithm to be used in trading a given securities order.

SUMMARY

Embodiments of the present disclosure are generally directed to methods, systems and computer program products that operate to recommend one or more of a plurality of trading algorithms for a given candidate order of a security, provide a graphical user interface (GUI), and/or provide other features.

Some embodiments are directed to a method of placing a security trade order using a trading algorithm in a computerized trading system. In the method, a first GUI is displayed on a display device of the system. Candidate order characteristics, which define a candidate order for a security, are received from a user through the first GUI. Current market characteristics associated with the candidate order are obtained. Performance and fill rate scores are forecasted for executions of the candidate order by each of a plurality of trading algorithms using a ranking model based on historical data for a plurality of orders previously-executed via one or more of the plurality of trading algorithms, the candidate order characteristics and the current market characteristics. The performance score relates to a transaction price obtained for the security by a trading algorithm, and the fill rate score relates to a percentage of completion of the order by a trading algorithm. Each of the plurality of trading algorithms are ranked for the candidate order for a performance category based on the forecasted performance score, and a fill rate category based on the forecasted fill rate score. A highest ranked trading algorithm is selected for each of the performance and fill rate categories, using the ranking model. The highest ranked trading algorithm is displayed for each of the performance and fill rate categories on a second GUI. A selection of one of the displayed highest ranked trading algorithms is received from a user. The candidate order is placed using the selected trading algorithm in response to receiving the selection using the system.

Some embodiments are directed to a computerized trading system that includes a display device, and one or more processors programmed to generate a graphical user interface (GUI) on the display device. The GUI includes one or more elements relating to candidate order characteristics of a candidate order of a security, one or more elements identifying one or more highest ranked trading algorithms selected from a plurality of available trading algorithms using a ranking model of the system, and selectable elements corresponding to each of the highest ranked trading algorithms. The highest ranked trading algorithms include a highest ranked performance trading algorithm that is predicted by the ranking model to achieve a high performance score for the candidate order, and/or a highest ranked fill rate trading algorithm that is predicted by the ranking model to achieve a high fill rate score for the candidate order. The performance score relates to a transaction price obtained for the security by a trading algorithm, and the fill rate score relates to a percentage of completion of the order by a trading algorithm. The system is configured to commence execution of the candidate order upon selection of a selectable element by a user using the corresponding trading algorithm.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

FIG. 8 is a table representing an exemplary Matrix B, in accordance with exemplary embodiments of the present disclosure.

FIG. 9 is a table representing an exemplary Vector $\mu$, in accordance with exemplary embodiments of the present disclosure.

DETAILED DESCRIPTION OF ILLUSTRATIVE EMBODIMENTS

Figure 1:
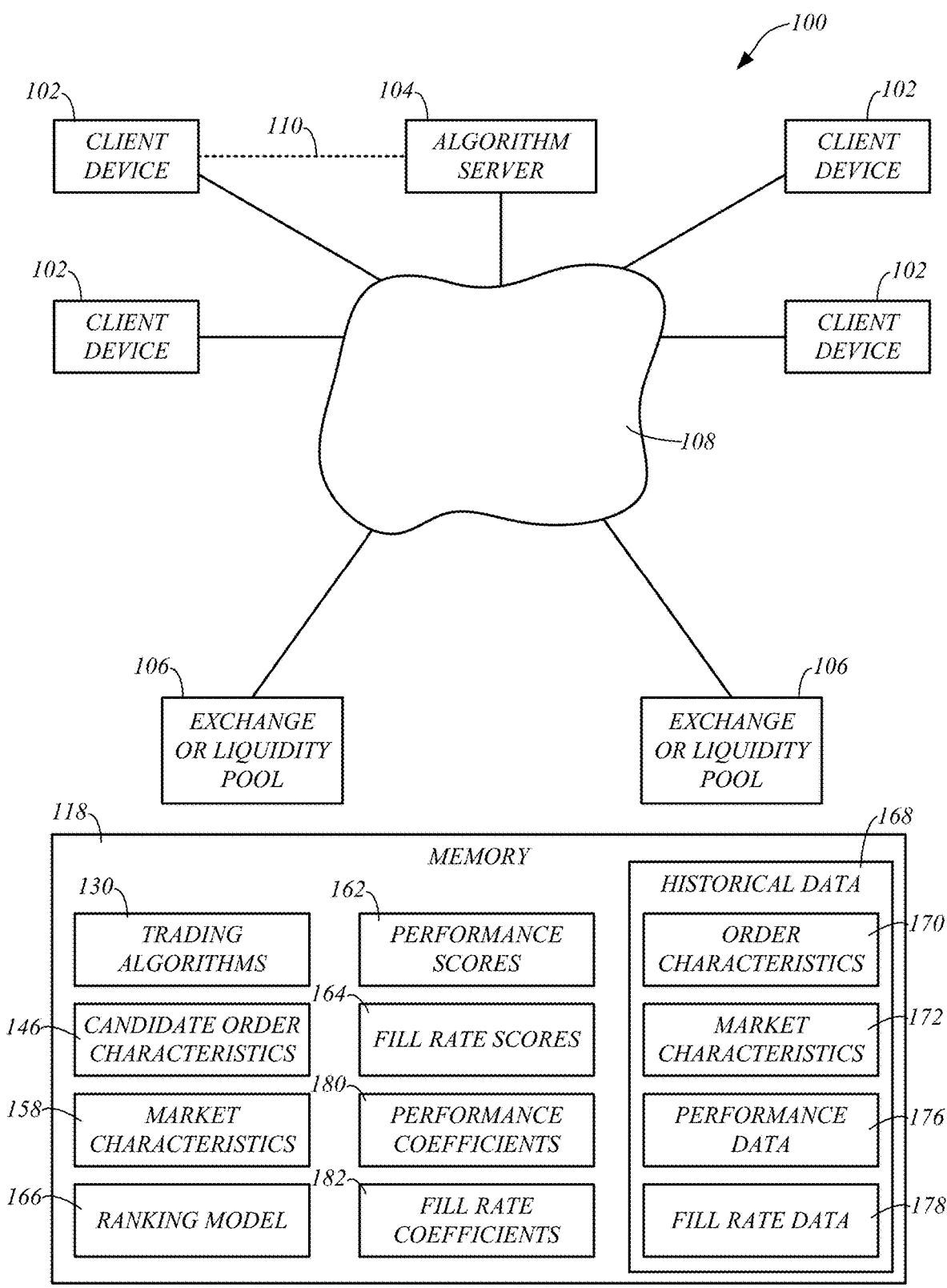
FIG. 1 is a simplified block diagram of an exemplary electronic trading system in accordance with embodiments of the present disclosure.

Embodiments of the present disclosure operate to reduce the time it takes for a trader to evaluate available trading algorithms in view of performance goals in an electronic trading system. These embodiments include methods, systems and computer program products that operate to recommend one or more of a plurality of trading algorithms for a given candidate order of a security, provide a graphical user interface (GUI), and/or other features that facilitate translating complex market data into readily actionable information for faster order placement, improved usability, greater accuracy in targeting the appropriate algorithm for meeting performance goals, and/or other advantages. As used herein, the term "security" may refer to equity securities (e.g., stocks), debt or fixed income securities (e.g., bonds), or any other security type known in the art.

These and other embodiments of the present disclosure are described more fully hereinafter with reference to the accompanying drawings. Elements that are identified using the same or similar reference characters refer to the same or similar elements. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

Specific details are given in the following description to provide a thorough understanding of the embodiments. However, it is understood by those of ordinary skill in the art that the embodiments may be practiced without these specific details. For example, circuits, systems, networks, processes, frames, supports, connectors, motors, processors, and other components may not be shown, or shown in block diagram form in order to not obscure the embodiments in unnecessary detail.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the description, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the present disclosure may be readily combined, without departing from the scope or spirit of the present disclosure.

It will be understood that, although the terms first, second, etc. may be used herein to describe various elements, these elements should not be limited by these terms. These terms are only used to distinguish one element from another. Thus, a first element could be termed a second element without departing from the teachings of the present disclosure.

Unless otherwise defined, all terms (including technical and scientific terms) used herein have the same meaning as commonly understood by one of ordinary skill in the art relating to the present disclosure. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. In some embodiments, the terms "instantaneous," "instantaneously," "instantly," and "in real time" refer to a condition where a time difference between sequential actions/events is no more than 1 minute. In some embodiments, the time difference between the sequential actions/events is no more than 1 second. In some embodiments, the time difference between the sequential actions/events is no more than a millisecond.

As will further be appreciated by one of skill in the art, embodiments of the present disclosure may be embodied as methods, systems, devices, and/or computer program products, for example. Accordingly, embodiments of the present disclosure may take the form of an entirely hardware embodiment, an entirely software embodiment or an embodiment combining software and hardware aspects. The computer program or software aspect of embodiments of the present disclosure may comprise computer readable instructions or code stored in a computer readable medium or memory. Execution of the program instructions by one or more processors (e.g., central processing unit) results in the one or more processors performing one or more functions or method steps described herein. Any suitable patent subject matter eligible computer readable media or memory may be utilized including, for example, hard disks, CD-ROMs, optical storage devices, or magnetic storage devices. Such computer readable media or memory do not include transitory waves or signals.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure may also be described using flowchart illustrations and block diagrams. Although a flowchart may describe the operations as a sequential process, many of the operations can be performed in parallel or concurrently. In addition, the order of the operations may be re-arranged. A process is terminated when its operations are completed, but could have additional steps not included in a figure or described herein.

It is understood that one or more of the blocks (of the flowcharts and block diagrams) may be implemented by computer program instructions. These program instructions may be provided to a processor circuit, such as a microprocessor, microcontroller or other processor, which executes the instructions to implement the functions specified in the block or blocks through a series of operational steps to be performed by the processor(s) and corresponding hardware components.

FIG. 1 is a simplified block diagram of an exemplary electronic or computerized trading system 100 in accordance with embodiments of the present disclosure. In some embodiments, the system 100 includes one or more client devices 102, one or more algorithm servers 104, and one or more exchanges/liquidity pools 106. In some embodiments, the term "exchange/liquidity pool" is broadly defined to include various trading venues, i.e., both lit and dark markets and liquidity pools, alternative trading systems (ATS's), electronic communication networks (ECN's), crossing networks, etc. In some embodiments, the system 100 processes information for a large number of users (e.g., at least 100; at least 500; at least 1,000; at least 10,000; at least 100,000; at least 1,000,000, etc.) and concurrent transactions (e.g., at least 100; at least 500; at least 1,000; at least 10,000; at least 100,000; at least 1,000,000, etc.).

In some embodiments, each client device 102, such as a trader terminal, is in communication with one or more of the algorithm servers 104 using a suitable data communication protocol. In some embodiments, one or more of the client devices 102 communicate with one or more of the servers 104 through a network 108, or another communication link, such as a direct communication link represented by dashed line 110. In some embodiments, the client devices 102 are configured for data communication with one or more of the exchanges/liquidity pools 106, such as through the network 108, or another suitable data communication link, such as a direct communication link. In some embodiments, one or more of the algorithm servers 104 are included in one or more of the client devices 102.

In some embodiments each algorithm server 104 may be located physically near or at the exchange/liquidity pool 106. In some embodiments, each algorithm server 104 is in communication with one or more of the exchanges/liquidity pools 106 using a suitable data communication protocol. In some embodiments, the one or more servers 104 may communicate with the exchanges/liquidity pools 106 through the network 108, or another suitable communication link.

Figure 2:
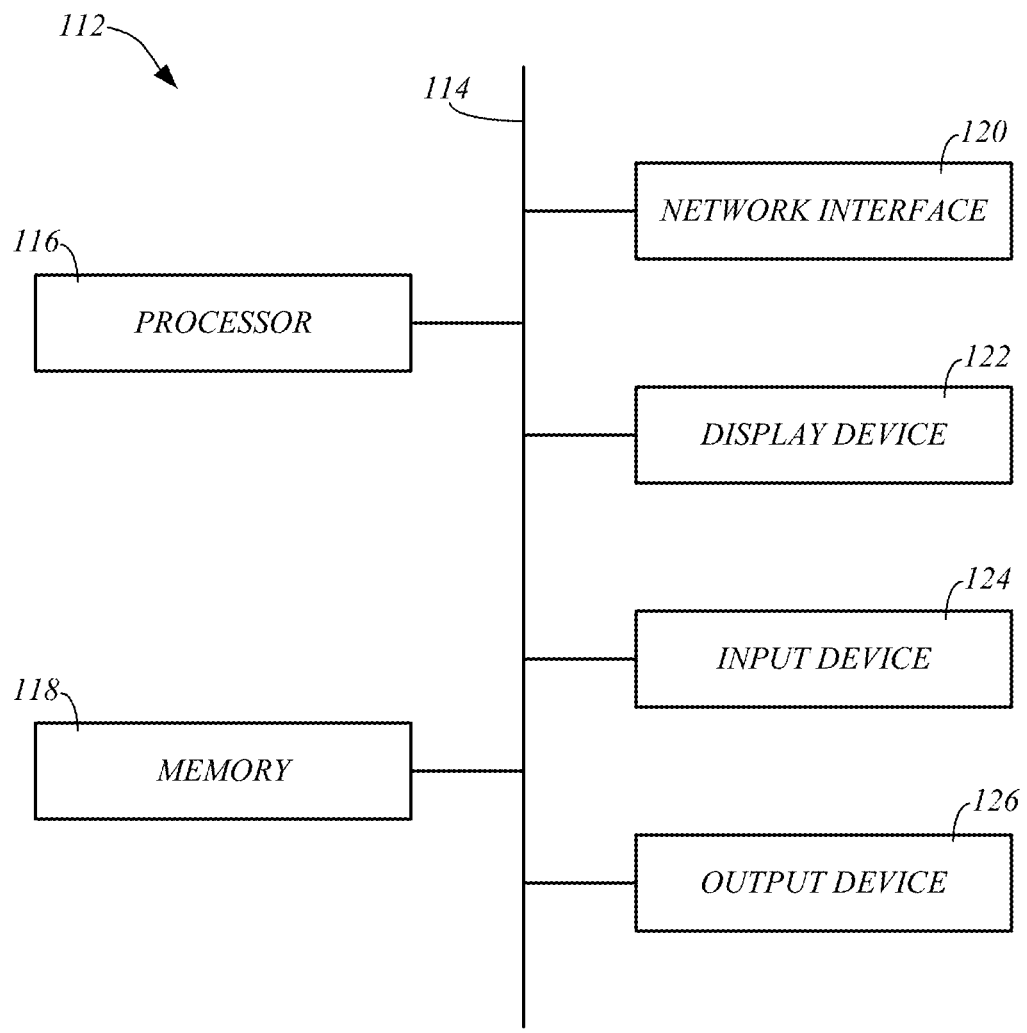
FIG. 2 is a simplified block diagram of an exemplary computing device in accordance with embodiments of the present disclosure.

In some embodiments, each client device 102, each algorithm server 104, and each of the exchanges/liquidity pool 106, include one or more computing devices 112, an example of which is illustrated in the simplified block diagram of FIG. 2. In some embodiments, each computing device 112 includes hardware components, such as, for example, a bus 114, a processor 116, memory 118, a network interface 120, a display device 122, an input device 124, an output device 126, and/or other computing device hardware components. Thus, each instance of the computing device 112 may include additional, different, or fewer components than those illustrated in FIG. 2.

In some embodiments, the processor 116 represents one or more microprocessors or central processing units, a single device or a combination of devices, such as associated with a network or distributed processing system. In some embodiments, the processor 116 may be programmed to perform the functions, acts, tasks, and method steps described herein through the execution of program code stored in the memory 118 and/or program code that is accessed by the processor 116 through the network interface 120, for example. In some embodiments, the processor 116 performs a suitable processing strategy, such as multi-processing, multi-tasking, parallel processing, and/or remote processing, for example. In some embodiments, such processing may be local or remote and may be moved from one processor to another processor.

In some embodiments, the memory 118 may be tangible computer readable media, such as that described above. The memory 118 may represent local memory to the computing device 112, or memory that is remote from the computing device 112, such as memory that is accessible over the network 108, for example. In some embodiments, the memory 118 may include a single device or multiple devices. For example, the memory 118 may include random access memory and hard drive storage. In some embodiments, the memory 118 may be adjacent to, part of, programmed with, networked with, and/or remote from processor 116 such that data stored in the memory 118 may be retrieved and processed by the processor 116. As mentioned above, in some embodiments, the memory 118 may store program instructions or code that are executable by the processor 116 to perform one or more of the acts or functions described herein. Thus, it is understood that method steps or other functions described herein include the performance of the method steps or functions in response to one or more processors 116 executing program code or instructions stored in one or more memory devices 118.

To simplify FIG. 1, the illustrated memory 118 represents one or more memory devices of the system 100, such as memory devices of the client devices 102, the algorithm server 104, or other memory that is accessible by the client devices 102 and/or the algorithm server 104. Thus, each of the programs and data stored in the memory 118 of FIG. 1 may be located in different memory devices, or the same memory device. Accordingly, in some embodiments, one or more of the data or programs stored in the memory devices represented by the memory 118 in FIG. 1 may be accessed by the client devices 102 and/or the server 104 directly accessible, accessed through the network 108, and/or accessed in another suitable manner. Accordingly, while specific data communication links between the memory 118 and the client devices 102, the algorithm server 104, and the network 108 are not illustrated in FIG. 1, it is understood that such data communication links exist in some embodiments of the present disclosure.

In some embodiments, the display device 122 includes a visual output device (e.g., electronic display, electronic paper, flat panel display, light-emitting diode (LED) displays, etc.). In some embodiments, the display device 122 is adapted to display a graphical user interface (GUI), such as an interactive trading screen allowing, for example, one or more trading actions to be performed by a user through the trading screen. For example, an interactive trading screen or GUI may allow one or more order entry parameters to be set and/or sent using one or more order entry actions. In some embodiments, the display device 122 and/or input device 124 may be used to interact with the GUI. In some embodiments, the display device 122 includes an input device 124, such as a touch screen interface. In some embodiments, the computing device 112 may not include the display device 122. In some embodiments, the output device 126 is separate from the display device 122.

In some embodiments, the input device 124 includes a keyboard, a mouse, a microphone, a touch-screen, a trackball, a keypad, a joystick, and/or other suitable input device for providing input to the computing device 112. In some embodiments, the input device 124 may be used, for example, to provide command selections to the processor 116. For example, the input device 124 may be a mouse or touchpad that is used to control a cursor displayed on a GUI presented on the display device 122.

Some embodiments of the algorithm server 104 facilitate the selection and implementation of one or more trading algorithms to execute a trade order submitted by a user of one of the client devices 102. Each trade order includes order characteristics or parameters that define the order. Exemplary order characteristics include an identification of the security to be traded (i.e., sold or purchased), a target quantity of the security to be traded, a limit price at which the security is to be purchased or sold, or other conventional trade order characteristics.

In some embodiments, the trading algorithms 130 are stored in memory 118 that is accessible by the processor 116 of the algorithm server 104, such as the memory 118 of the computing device 112 that forms the algorithm server 104, for example, as generally illustrated in FIG. 1. Each of the trading algorithms 130 are computerized trading tools that implement models and strategies to complete security transactions within the parameters or order characteristics of the trade order. Different trading algorithms utilize different models and parameters to implement unique trading strategies. For example, a trading algorithm 130 may be used to divide up a large block order into smaller orders that are easier to execute, or implement other trading strategies.

Selecting the most suitable trading algorithm 130 for a given security trade order is not a trivial task. A large number of order and market characteristics influence an algorithm's performance for a given order. This makes the task of evaluating how such characteristics may influence the performance of the execution of the trade order by a given algorithm very difficult for a trader. Furthermore, it is necessary to perform this evaluation task for each of the numerous trade algorithms that are available to the trader to determine which of the algorithms may be best suited to execute the trade order. This problem is exacerbated by the trader's need to complete the evaluation of the trade algorithms within a short period of time, such as a few minutes or even a few seconds.

Additionally, the modifications to orders made by a trader during the lifetime of an order execution, such as changes to the limit prices, revisions, cancellations, etc., impair the ability to fairly breakdown an algorithm's performance between its logic and the trader's intervention. Moreover, the presence of limit prices heavily influences an algorithm's handling of an order, with on average schedule-based algorithms (e.g., Implementation Shortfall) doing a poorer job than tactical/opportunistic algorithms.

Embodiments of the present disclosure include methods, systems, and computer program products that operate to evaluate a plurality of trading algorithms for a given candidate trade order, identify the most suited algorithms to trade the candidate trade order, present a GUI to facilitate the presentation of information regarding the identified algorithms and selection of a trading algorithm by the user, and/or provide other features. These embodiments generally facilitate translating complex market data into readily actionable information for faster order placement, improved usability, greater accuracy in targeting the appropriate trading algorithm for meeting performance goals, and/or provide other advantages and improvements to electronic trading systems.

Figure 3:
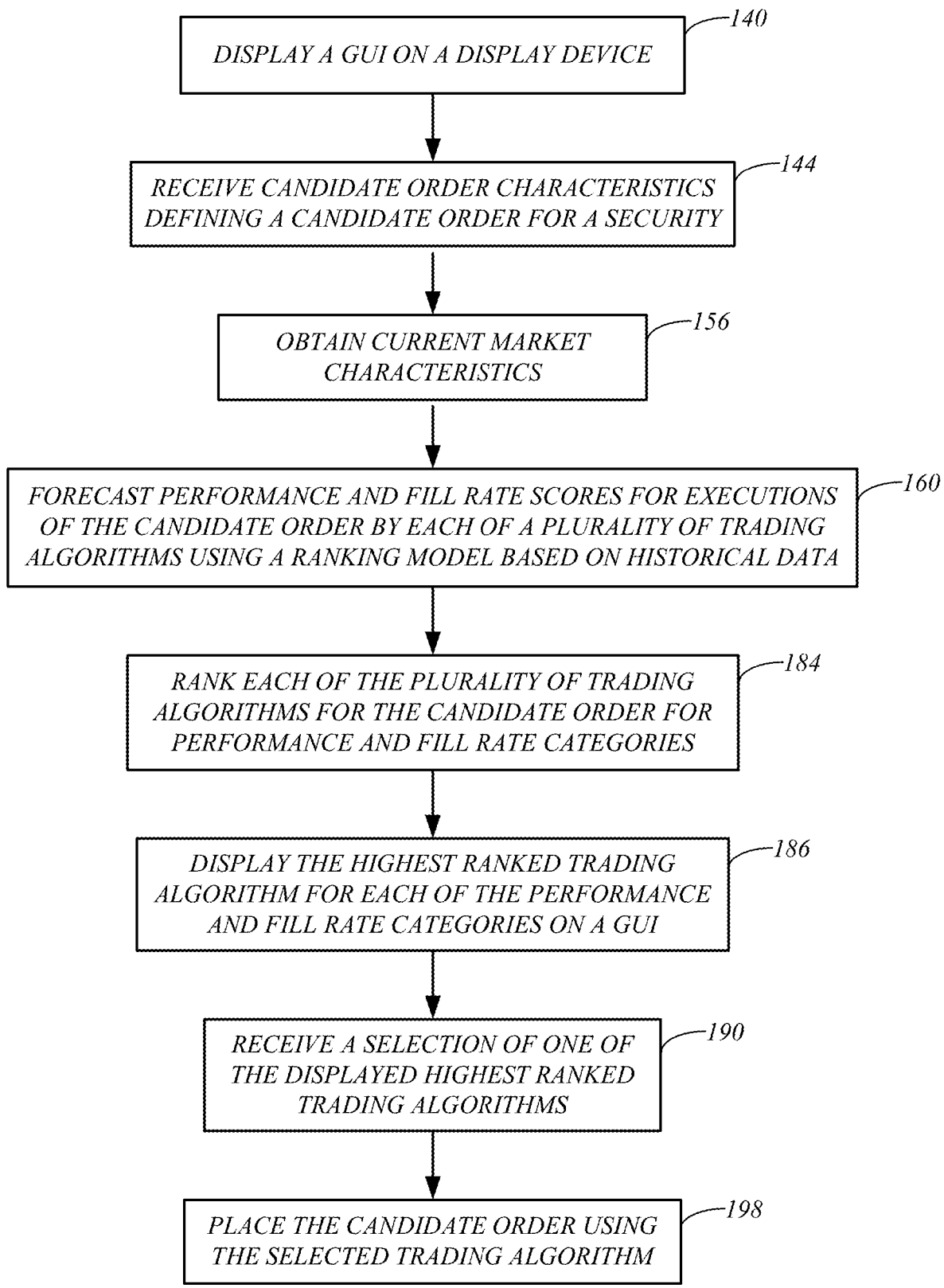
FIG. 3 is a flowchart illustrating a method of placing a security trade order using a trading algorithm in a computerized trading system, in accordance with embodiments of the present disclosure.
Figure 4A:
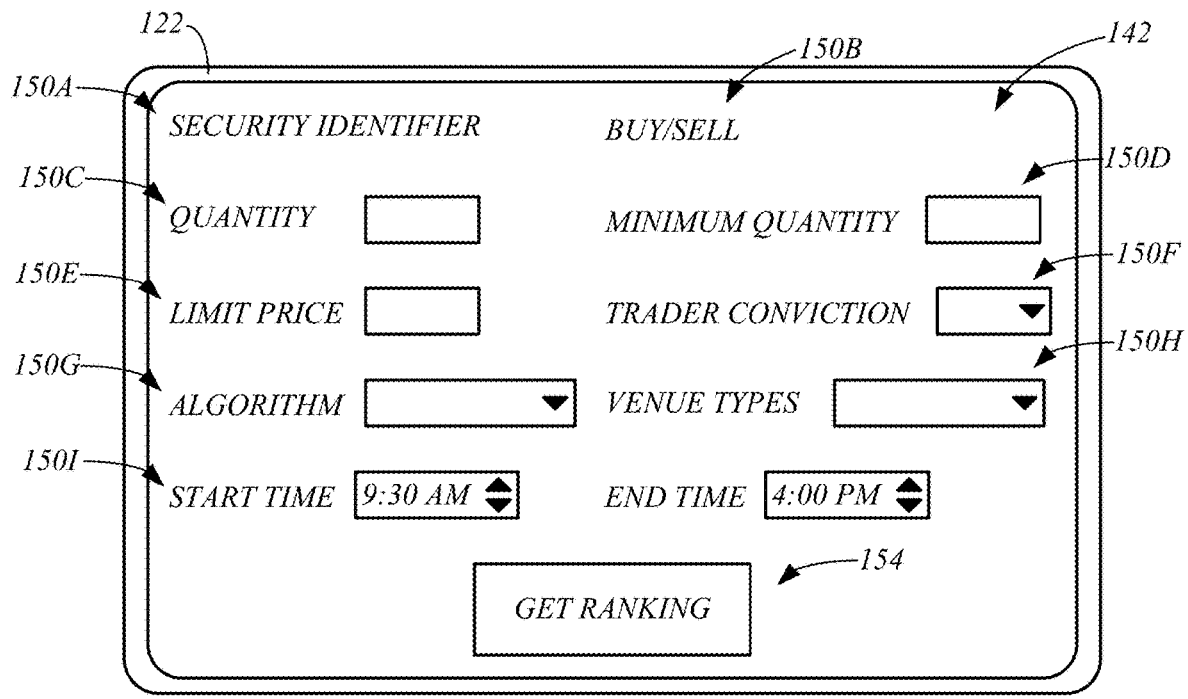
FIGS. 4A and 4B are exemplary graphical user interfaces in accordance with embodiments of the present disclosure.
Figure 4B:
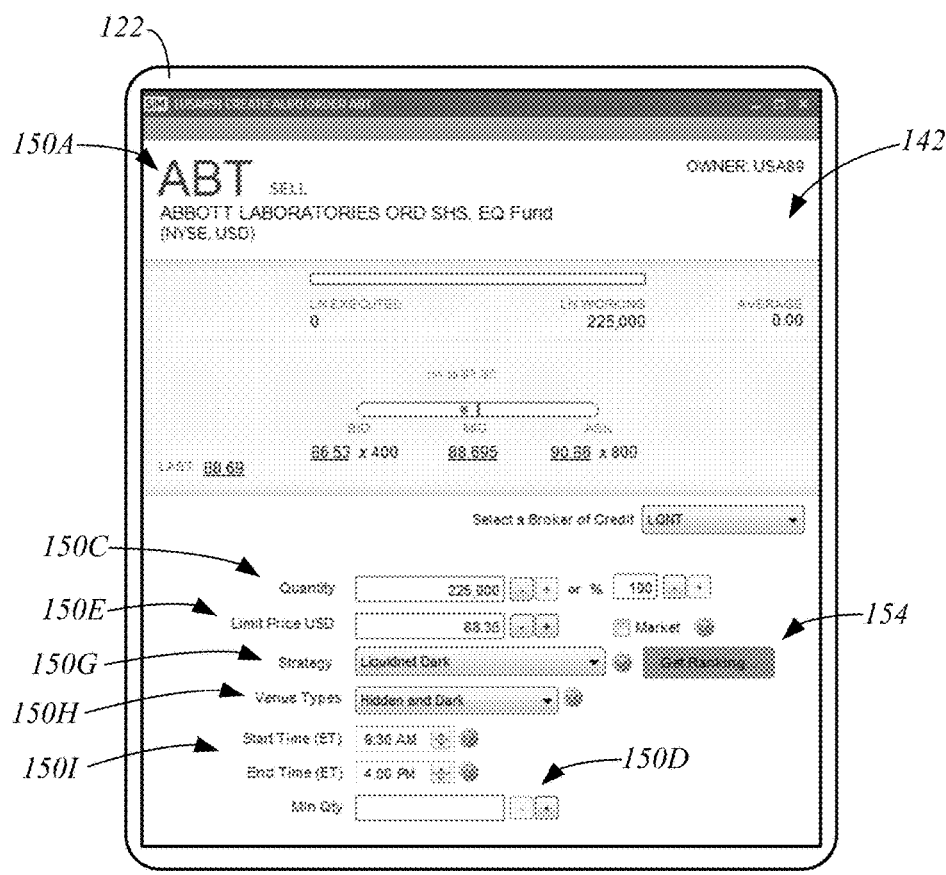

FIG. 3 is a flowchart illustrating a method of placing a security trade order using a trading algorithm 130 in a computerized or electronic trading system, in accordance with embodiments of the present disclosure. At 140 of the method, a GUI is displayed on a display device 122 of the system 100. FIGS. 4A and 4B illustrate exemplary GUI's 142 on a display device 122 in accordance with embodiments of the present disclosure. The GUI 142 may be presented in one or more windows, pop-up windows, or other visual elements on the display device 122. The display device 122 may be a component of a computing device 112 forming one of the client devices 102, for example, or other computing device 112 of the system 100.

At 144 of the method, one or more candidate order characteristics 146 (FIG. 1) that define a candidate order for a security are received from a user through the GUI 142. Exemplary embodiments of the candidate order characteristics 146 include an identification of the security to be traded, a target quantity of the security to be traded, a limit price for the security, an indication as to whether the order is on the buy or sell side, and/or other conventional candidate order characteristics. In some embodiments, a user of the system 100 enters the one or more candidate order characteristics through the GUI 142 presented on one of the client devices 102 or other computing device 112, for example. In some embodiments, the GUI 142 includes a display of textual and/or graphical elements, generally referred to as 150, relating to the candidate order characteristics 146. In some embodiments, the elements 150 may be used by the user to enter one or more of the candidate order characteristics. Thus, the elements 150 may include data entry fields, drop-down menus, scrolling elements, and other conventional GUI elements 150 for entering information.

Exemplary elements 150 that may be presented on the GUI 142 include a security identifier 150A for entering or identifying the security to be traded, a buy or sell instruction element 150B for designating the candidate order as a buy or sell order, a target quantity element 150C for entering the target quantity of the security to be traded, a minimum quantity element 150D for entering a minimum quantity of a block of the security to be traded, a limit price element 150E for entering a limit price for the candidate order, a trader conviction element 150F, an algorithm element 150G for selecting one of the trading algorithms 130 to be used to place or execute the candidate order, a venue type element 150H for entering the venue type through which the security is to be traded, one or more time elements 150I for entering a period of time during which the candidate order is open for execution, and/or other elements relating to the candidate order characteristics, as shown in FIGS. 4A and 4B.

In some embodiments, the trader conviction element 150F of the GUI 142 (FIG. 4A) may be used by the user to input to the system 100 a value indicating a bullish, neutral, or bearish conviction regarding the candidate order. The element 150F may include any suitable element of entering the trader conviction input, such as a drop down menu, a value, or other suitable measure of the trader conviction of the user. For example, the element 150F may provide the user with a selection of trader conviction on a scale of 1-5, with 1 being a more bullish conviction, 3 being a neutral conviction, and 5 being a more bearish conviction. Other suitable elements 150F may also be used.

In some embodiments, the GUI 142 presents a selectable or actionable element 154 that may be selected by the user to trigger the system 100 into performing the evaluation of a plurality of the trading algorithms 130 for the candidate order. The selectable element 154 of the GUI 142 may take on various forms. In some embodiments, the selectable element 154 includes a button, as shown in FIG. 4A or 4B.

At 156 of the method, the algorithm server 104 or the client device 102 of the system 100 obtains current market characteristics 158 (FIG. 1) that are associated with the candidate order. Exemplary candidate order market characteristics 158 include a 20-day average daily volume remaining for the security, the target quantity of the candidate order as a percentage of the 20-day average daily volume remaining, a difference between a prevailing price of the security and the limit price of the candidate order, a behavior of the price of the security over a predetermined period, a dark volume as a percentage of total market volume from market opening, a number of blocks of the security traded since market opening, a sensitivity of a return of the security to a return of the market, a thirty-day close-to-close price volatility of the security, a multi-day historical spread for the security that is exponentially weighted with a multi-day half-life, and/or other candidate order market characteristic that is associated with the candidate order. As explained below, one or more of these candidate order market characteristics 158 may be presented on a GUI presented on a display device 122 of the system 100.

At 160 of the method, performance scores 162 and fill rate scores 164 (FIG. 1) are forecasted by the system 100 for executions of the candidate order by each of a plurality of trading algorithms 130 using a ranking model 166. The trading algorithms 130 and the ranking model 166 may be contained within memory 118 of the algorithm server 104, one or more of the client devices 102, or other memory that is accessible by the system 100. The performance scores 162 relate to a transaction price obtained for the security by a trading algorithm, such as a basis point performance of the order performed by the trading algorithm. The fill rate scores 164 relate to a percentage of completion of the order by a trading algorithm. As understood by those skilled in the art, the performance and fill rate scores generally go hand-in-hand. For example, when a trading algorithm receives a good performance score, it is more likely to receive a poor fill rate score, and vice versa.

In some embodiments, the ranking model 166 uses historical data 168 to forecast the performance and fill rate scores 162 and 164. The historical data 168 relates to data from a plurality of orders that were previously executed by the trading algorithms 130. In some embodiments, the historical data 168 for each of the previously-executed orders includes order characteristics 170 and market characteristics 172. In some embodiments, the order characteristics for each of the previously-executed orders includes an identification of the security to be traded, a target quantity of the security, a limit price for the security, the trading algorithm used to execute or place the order including the parameters selected for the algorithm, a duration of time during which the algorithm traded the order, and/or other order characteristics. The market characteristics 172 include one or more of the exemplary market characteristics 158 described above.

In some embodiments, the historical data 168 for each of the previously-executed orders includes performance data 176 and fill rate data 178, as indicated in FIG. 1. The performance data 176 indicates a basis point performance of the order performed by the trading algorithm. The fill rate data 178 indicates a fraction of the orders target quantity that was filled by the trading algorithm.

In some embodiments of step 160, the performance and fill rate scores 162 and 164 (FIG. 1) for the candidate order are forecasted by the ranking model 166 using calculated performance coefficients 180 and fill rate coefficients 182. In some embodiments, the ranking model 166 calculates the performance coefficients 180 and the fill rate coefficients 182 (FIG. 1) based on the historical data 168, such as the performance data 176 and the fill rate data 178. In some embodiments, the calculation of the performance and fill rate coefficients 180 and 182 by the trading model 166 involves fitting multinomial regressions to express the performance and fill rate scores 162 and 164 as a function of the order characteristics 162 and the market characteristics 158 of the candidate order. Exemplary calculations of the performance and fill rate scores 162 and 164 are described below in greater detail.

In some embodiments, the ranking model 166 removes outliers of the historical data 168 used to calculate the performance and fill rate coefficients 180 and 182. In some embodiments, the ranking model 166 verifies the accuracy and forecasting power of the calculated coefficients 180 and 182. In some embodiments, appropriate fit statistics and plots are used to verify that the multinomial distributions estimated based on the coefficients 180 and 182 by the ranking model 166 do indeed fit the historical data 168, both in an in-sample and an out-sample manner.

In some embodiments of step 160 of the method, the performance and fill rate scores 162 and 164 are forecasted for executions of the candidate order by each of the plurality of trading algorithms 130 based on the trader conviction input of the user, such as that entered through element 150F of the GUI 142 (FIG. 4A).

At 184 of the method, each of the plurality of trading algorithms 130 for the candidate order are ranked for performance and fill rate categories. The rank for the performance category indicates how well the trading algorithms 130 are forecasted to obtain a good transaction price for the candidate order, and the rank for the fill rate category indicates how well the trading algorithms are forecasted to complete the candidate order. In some embodiments, each of the plurality of trading algorithms 130 is ranked for the performance category based on the forecasted performance scores 162 for the trading algorithm, and each of the plurality of trading algorithms 130 is ranked for the fill rate category based on the forecasted fill rate scores 164 for the trading algorithm. In some embodiments, the ranking step 184 is performed by the ranking model 166. In some embodiments, the ranking step 184 may be performed using a processor 116 of one of the client devices 102, the algorithm server 104, or other device of the system 100.

In some embodiments of the ranking step 184, each of the plurality of trading algorithms 130 is ranked for a combination performance and fill rate category. The combination performance and fill rate category is based on a combination of the forecasted performance scores 162 and the forecasted fill rate scores 164. In some embodiments, the forecasted performance and fill rate scores 162 and 164 are weighted differently to achieve the ranking for the combined performance and fill rate category. In some embodiments, more weight is given to the forecasted performance scores 162 over the forecasted fill rate scores 164. In some embodiments, more weight is given to the forecasted fill rate scores 164 over the forecasted performance scores 162 by the ranking model 166. In some embodiments of this ranking step, the highest ranked trading algorithm 130 is selected or identified for the combination performance and fill rate category using the ranking model 166.

Figure 5A:
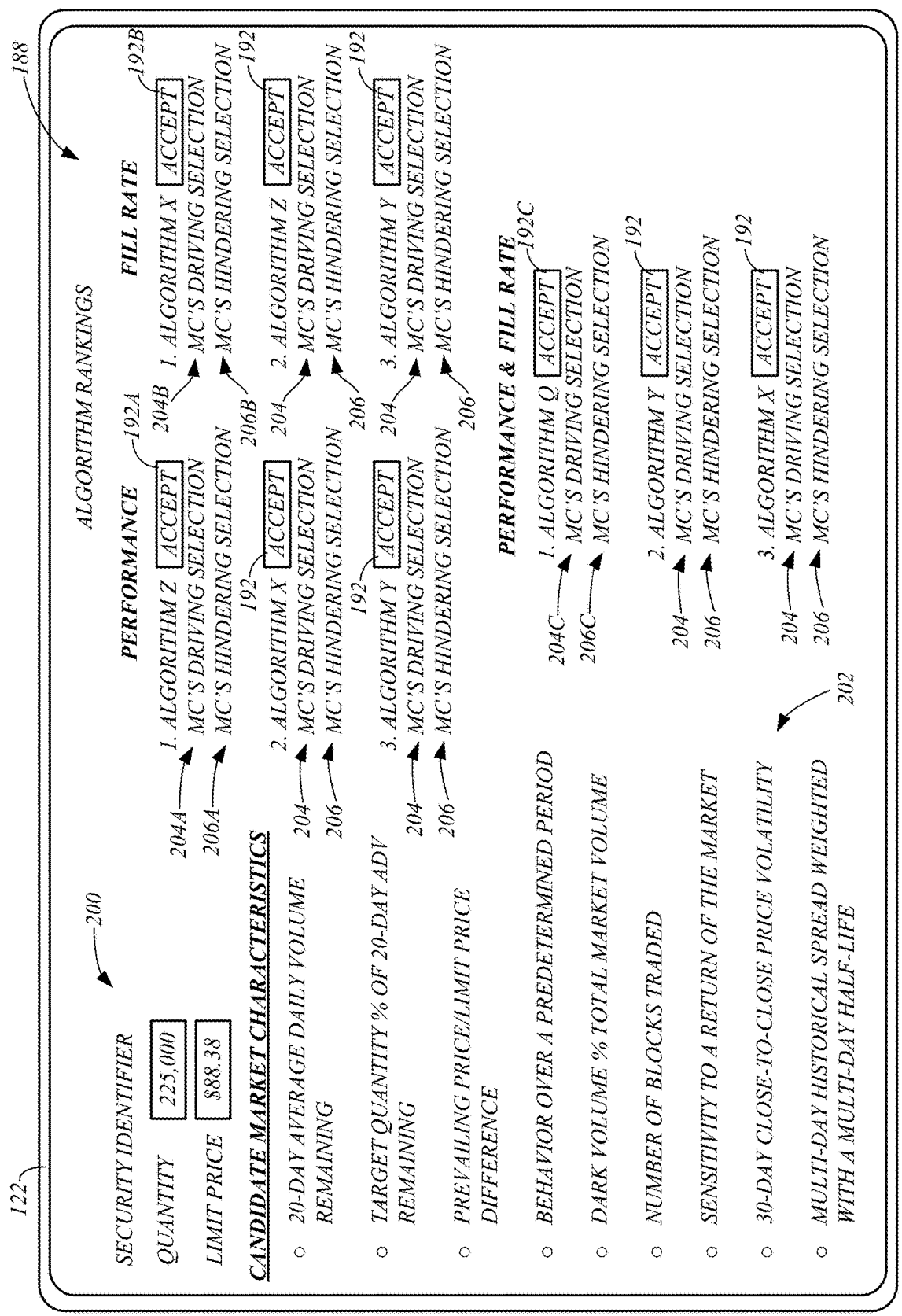
FIGS. 5A and 5B are exemplary graphical user interfaces in accordance with embodiments of the present disclosure.
Figure 5B:
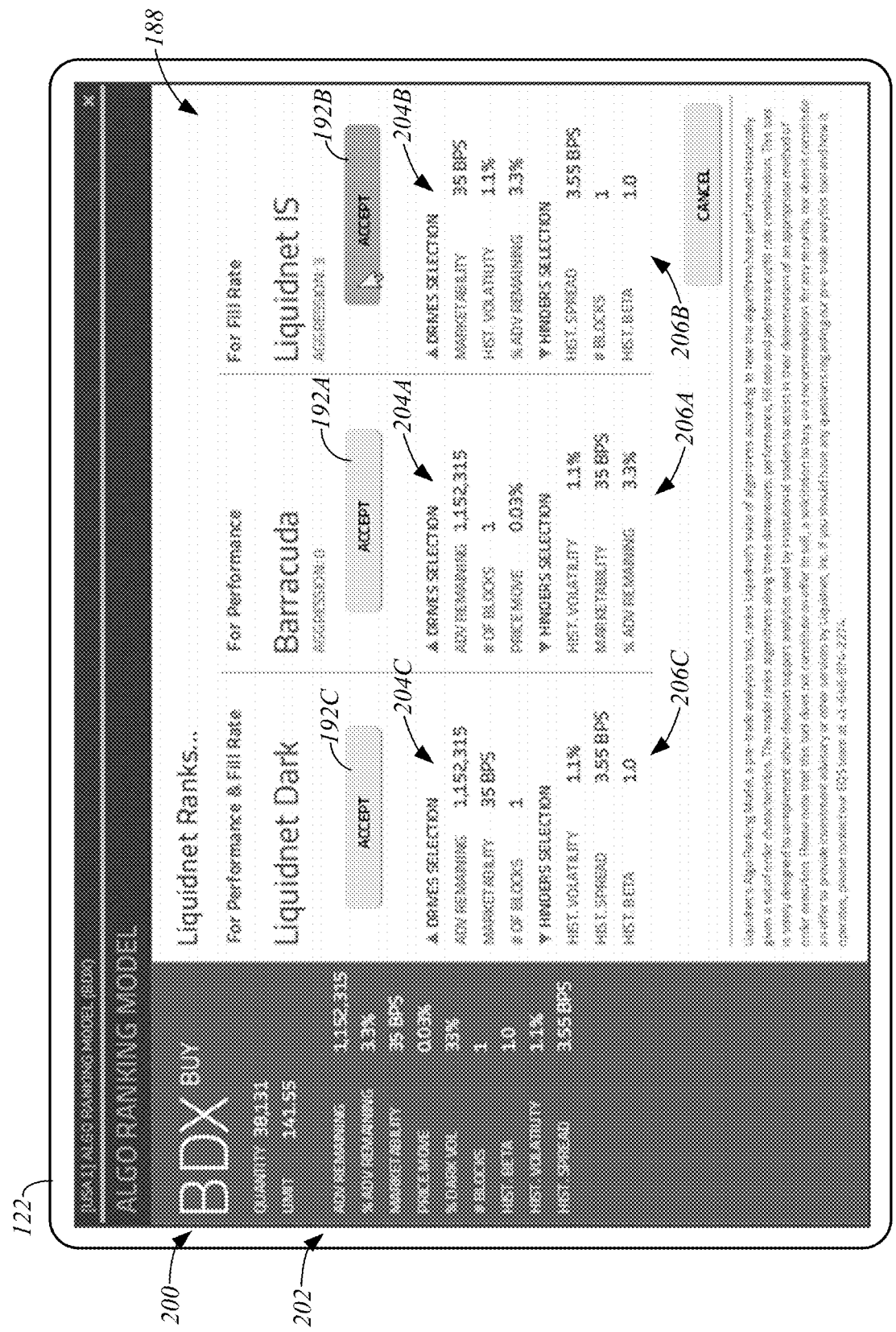

At 186 of the method, the highest ranked trading algorithm for each of the performance and fill rate categories is displayed on a GUI 188 of the display device 122, as shown in the exemplary GUI's 188 illustrated in FIGS. 5A and 5B. The GUI 188 may be presented in one or more windows, pop-up windows, or other visual elements on the display device 122. In some embodiments, the GUI 188 may be distinct from the GUI 142, such as a distinct screen image on the display device 122, or the GUI 188 may be presented along with the GUI 142 on the display device 122. In some embodiments, the GUI 188 may be presented on a different display device 122 than that used to display the GUI 142.

In some embodiments, the GUI 188 identifies the highest ranked algorithm 130 for the performance category, such as "ALGORITHM Z" (FIG. 5A) or "Barracuda" (FIG. 5B), and the highest ranked trading algorithm 130 for the fill rate category, such as "ALGORITHM X" (FIG. 5A) and "Liquidnet IS" (FIG. 5B). In some embodiments, the GUI 188 may list one or more of the next highest ranked trading algorithms 130 for the performance and fill rate categories, as shown in the exemplary GUI 188 of FIG. 5A. For instance, the GUI 188 may list "ALGORITHM X" and "ALGORITHM Y" as the second and third highest ranked trading algorithms 130 for the performance category along with the highest ranked trading algorithm "ALGORITHM Z", as shown in FIG. 5A. Likewise, the GUI 188 may include a listing of the next highest ranked trading algorithms 130 corresponding to the fill rate category. For example, the GUI 188 may list "ALGORITHM Z" and "ALGORITHM Y" as the second and third highest ranked trading algorithms 130 for the fill rate category, as shown in FIG. 5A.

In some embodiments, the selected or identified highest ranked trading algorithm 130 for the combination performance and fill rate category is displayed on the GUI 188. For example, the GUI 188 may list "ALGORITHM Q" (FIG. 5A) or "Liquidnet Dark" (FIG. 5B) as the highest ranked trading algorithm 130 for the combination performance and fill rate category. In some embodiments, a plurality of the highest ranked trading algorithms 130 for the combination performance and fill rate category are displayed within the GUI 188. For example, the GUI 188 may display the highest ranked trading algorithm 130, and one or more of the next highest ranked trading algorithms 130 for the combination performance and fill rate category, such as "ALGORITHM Y" and "ALGORITHM X" shown in the GUI 188 of FIG. 5A.

At 190 of the method, a selection of one of the displayed highest ranked trading algorithms 130 is received by the system 100, such as through one of the client devices 102, for example. In some embodiments, the selection received at step 190 is provided by the user through the GUI 188, the input device 124, or through another suitable method. In some embodiments, the GUI 188 includes one or more selectable elements, generally referred to as 192, corresponding to the displayed one or more highest ranked trading algorithms 130, which is selectable by the user to provide the selection received by the system 100 in step 190. The selectable element 192 may take on any suitable form, such as a button, as shown in FIGS. 5A and 5B. For example, the GUI 188 may include a selectable element 192A that corresponds to the highest ranked trading algorithm 130 for the performance category, and a selectable element 192B corresponding to the highest ranked trading algorithm 130 corresponding to the fill rate category, as shown in FIGS. 5A and 5B. In some embodiments, the GUI 188 includes a selectable element 192C corresponding to the displayed highest ranked trading algorithm 130 for the combination performance and fill rate category, as shown in FIGS. 5A and 5B. Other displayed ranked trading algorithms 130 may also include corresponding selectable elements 192, as shown in FIG. 5A.

At 198 of the method, the candidate order is placed using the trading algorithm 130 selected in step 190. The selected trading algorithm 130 then proceeds to execute or place the candidate order in accordance with conventional electronic trading practices.

Some embodiments of the GUI 188 include textual and/or graphical elements 200 relating to the candidate order characteristics 146, textual and/or graphical elements 202 relating to the current market characteristics 158 for the candidate order, and/or other elements, as shown in FIGS. 5A and 5B.

In some embodiments, the GUI 188 identifies the current market characteristics 158 that affected the selection of the one or more highest ranked trading algorithms 130, such as those that drove the selection and/or those that hindered the selection. In some embodiments, a first subset of the current market characteristics that drove the selection of each of the highest ranked trading algorithms 130 are identified by the ranking model 166. In some embodiments, the GUI 188 includes textual and/or graphical elements, generally referred to as 204, that identify the first subsets. For example, the GUI 188 may include an element 204A identifying a first subset of the candidate order market characteristics 158 that drove the selection of "ALGORITHM Z" or "Barracuda" for the performance category by the ranking model 166, an element 204B identifying the first subset of the candidate order market characteristics 158 that drove the selection of "ALGORITHM X" or "Liquidnet IS" for the fill rate category by the ranking model 166, and/or an element 204C identifying a first subset of the candidate order market characteristics 158 that drove the selection of "ALGORITHM Q" or "Liquidnet Dark" for the combined performance and fill rate category by the ranking model 166, as indicated in FIGS. 5A and 5B. Elements 204 identifying the first subsets of the candidate order market characteristics 158 that drove the selection of other highest ranked trading algorithms 130 by the ranking model 166 may also be displayed in the GUI 188, as shown in FIGS. 5A and 5B. For example, the exemplary element 204A may include an identification or listing of the first subset of the current market characteristics 158 that drove the selection of the "Barracuda" trading algorithm that identifies the average daily value remaining, the number of blocks, and the price move market characteristics, as shown in FIG. 5B.

In some embodiments, a second subset of the current market characteristics that hindered the selection of each of the highest ranked trading algorithms 130 are identified by the ranking model 166. In some embodiments, the GUI 188 includes textual and/or graphical elements, generally referred to as 206, that identify the second subsets. For example, the GUI 188 may include an element 206A identifying a second subset of the candidate order market characteristics 158 that hindered the selection of "ALGORITHM Z" or "Barracuda" for the performance category by the ranking model 166, an element 206B identifying the second subset of the candidate order market characteristics 158 that hindered the selection of "ALGORITHM X" or "Liquidnet IS" for the fill rate category by the ranking model 166, and/or an element 206C identifying the second subset of the candidate order market characteristics 158 that hindered the selection of "ALGORITHM Q" or "Liquidnet Dark" for the combined performance and fill rate category by the ranking model 166, as indicated in FIGS. 5A and 5B. Elements 206 identifying the second subsets of the candidate order market characteristics 158 that hindered the selection of other highest ranked trading algorithms 130 by the ranking model 166 may also be displayed in the GUI 188, as shown in FIGS. 5A and 5B. For example, the exemplary element 206A may include an identification or listing of the second subset of the current market characteristics 158 that hindered the selection of the "Barracuda" trading algorithm that identifies the average daily value remaining, the number of blocks, and the price move market characteristics, as shown in FIG. 5B.

During the execution of the candidate order following step 198 (FIG. 3), changes in the current market conditions 158 may warrant a change in the trading algorithm 130. Some embodiments of the present disclosure are directed to systems and methods for performing a course correction that changes the selected trading algorithm 130 that is currently executing the candidate order, to a different trading algorithm 130 that is better suited to executing the open portion of the candidate order due to a change in the market conditions 158 from the time the candidate order was originally placed.

In some embodiments, following step 198 of the method of FIG. 3, the candidate order is executed for a period of time using the selected trading algorithm 130. This execution of the candidate order may result in at least an open portion of the candidate order not being fully executed or placed using the trading algorithm 130. In some embodiments, the ranking model 166 performs a new evaluation of the trading algorithms 130 for the open portion of the candidate order, ranks each of the plurality of the trading algorithms 130 for the open portion of the candidate order, and notifies the user when the new highest rank training algorithm is different from the trading algorithm 130 that was initially selected to place the candidate order in step 198 of the method.

Figure 6:
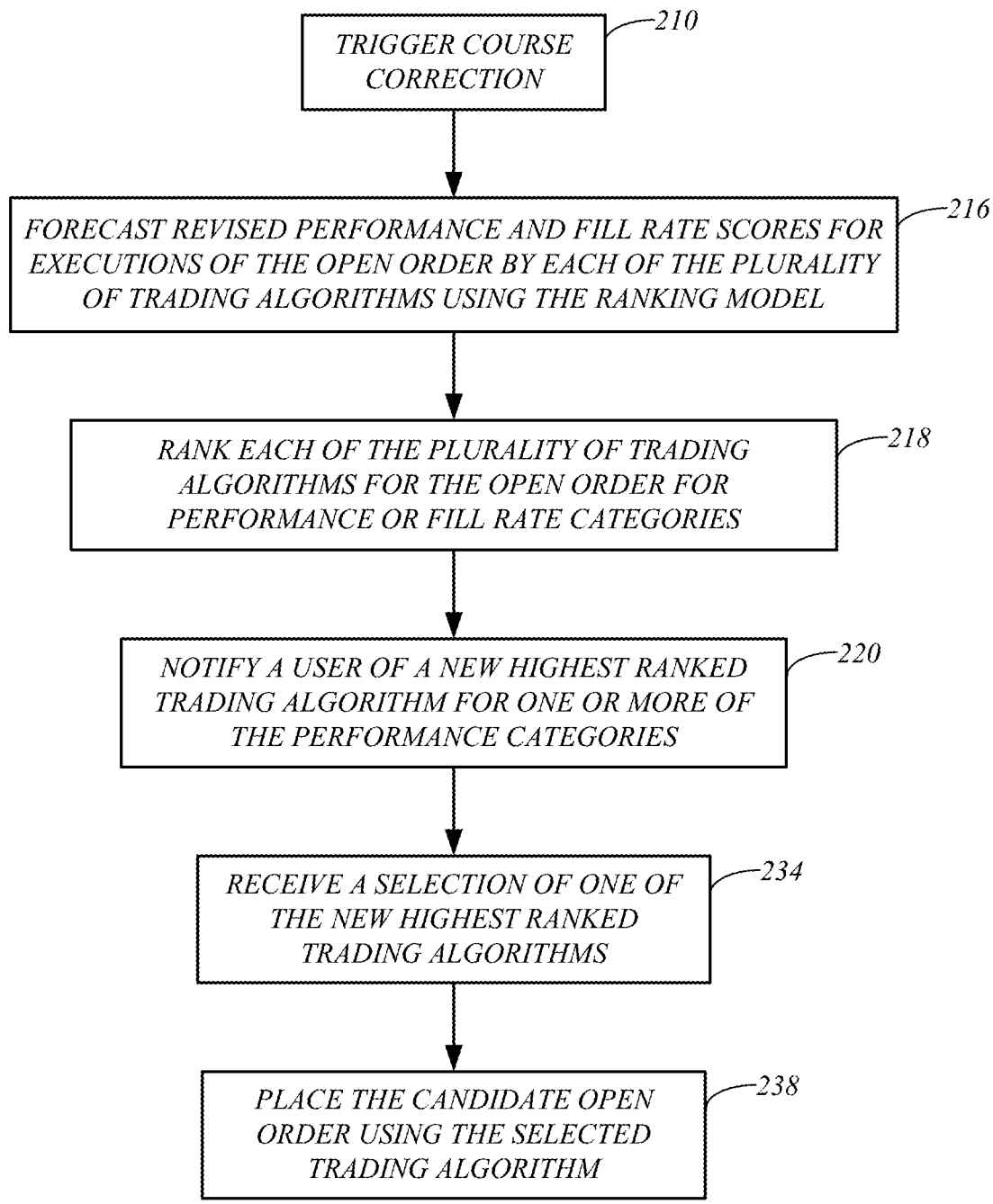
FIG. 6 is a flowchart illustrating a method in accordance with embodiments of the present disclosure.

FIG. 6 is a flowchart illustrating an exemplary course correction method in accordance with embodiments of the present disclosure. In some embodiments, a course correction is initially triggered, at step 210 of the method. This triggering of the course correction may include an initial trigger that occurs automatically after a predetermined period of time has elapsed since the initial order was placed (step 198), such as 2 minutes, for example. Other periods of time for the initial trigger may also be used, such as less than 1 minute, less than 2 minutes, less than 5 minutes, or other suitable period of time. The course correction may also be initially triggered based on a change in one or more of the market conditions 158 since the order was initially placed, or based on other factors.

In some embodiments of step 210, a determination is made as to whether to proceed with a reevaluation of the algorithms 130 for the open portion of the candidate order based on the characteristics 146 of the open portion of the candidate order, and the current market conditions 158. In some embodiments, the current market conditions 158 are obtained and evaluated with respect to the characteristics 146 of the open portion of the candidate order using the ranking model 166. In some embodiments, this evaluation includes one or more calculations based on the current market conditions 158 and the characteristics 146. Exemplary options for determining when to trigger the reevaluation of the algorithms 130 are provided below.

In some embodiments of step 210, the ranking model 166 obtains characteristics 146 of the open portion of the candidate order including, for example, one or more of the following characteristics: an identification of the security, such as a stock symbol; the side of the trade (i.e., buy or sell); the target quantity; and the limit price (Limitprice). In some embodiments, additional information may be obtained such as, for example, the duration (OrderDuration$_{mins}$) since the last execution of the order, such as since the placement or execution of the order (step 198) or since the last placement or execution of an open portion of the order using the course correction method; a timestamp ($T_{reset}$) at the start of the order (step 198) or at the last placement or execution of an open portion of the order; the current time ($T_{current}$); the percentage the target quantity of the candidate order that has been filled (% Fill); the mid-price (Midprice) at $T_{current}$ ($P_{current}$); and the mid-price at $T_{reset}$ ($P_{reset}$). A Marketability$_{bps}$ is calculated based on the Limitprice from Midprice at $T_{current}$ and $T_{reset}$, and is adjusted for side as follows:

$$\text{Marketability}_{bps} = 10000 * \left(\frac{Limitprice}{Midprice} - 1\right) \text{if side} = \text{Buy}$$

$$\text{Marketability}_{bps} = -10000 * \left(\frac{Limitprice}{Midprice} - 1\right) \text{if side} = \text{Sell}$$

In some embodiments, the course correction and reevaluation of the trading algorithms 130 for the open portion of the candidate order are triggered in step 210 when a time counter ($T_{counter, mins}$) meets or exceeds the predetermined period for the initial trigger of step 210, such as 2 minutes or other period of time, and one of the following exemplary conditions are met.

(1) $\left|\frac{P_{current} - P_{reset}}{P_{current}}\right| > P_{threshold}$ (2) % Fill$_{current}$ > Fill$_{threshold}$ (3) $T_{current} - T_{reset} = T_{threshold}$ (4) |Marketability$_{reset,bps}$ − Marketability$_{current,bps}$| > Marketability$_{threshold,bps}$ For condition (1), the threshold value P$_{threshold}$ may be set to a desired percentage, such as 1%, for example. For condition (2), the threshold value Fill$_{threshold}$ may be set to a desired percentage, such as 30%, for example. For condition (3), the threshold value T$_{threshold}$ may be set to a desired time that will trigger the reevaluation of the trading algorithms 130, such as 10 minutes, for example. For condition (4), the threshold value Marketability$_{threshold,bps}$ may be set to a desired basis point, such as 50 bps, for example.

If the reevaluation is triggered in step 210, the method proceeds to 216, and revised performance and fill rate scores 162 and 164 are forecasted using the ranking model 166 for execution of the open portion of the candidate order by each of the plurality of trading algorithms 130. In some embodiments, this forecasting of the revised performance and fill rate scores 162 and 164 is performed by the ranking model 166 based on the historical data 168, the order characteristics 146 of the open portion of the candidate order, and the current market characteristics 158. The open order characteristics 146 include one or more of the candidate order characteristics described above, such as the identification of the security being traded, a target quantity of the security to be traded, and a limit price for the security.

At 218 of the method, each of the plurality of trading algorithms 130 are ranked for the open order for performance and/or fill rate categories using the ranking model 166. In some embodiments of step 218, the plurality of trading algorithms 130 are only ranked for the category that corresponds to the category of the selected highest ranked trading algorithm used to initially place the candidate order in step 198 of the method. Thus, for example, when the highest ranked trading algorithm 130 used to place the candidate order corresponded to the performance category, the ranking model 166 focuses the ranking step 218 on ranking the plurality of trading or algorithms 130 for the performance category. Similarly, if the highest ranked trading algorithm 130 used to initially place the candidate order was ranked for the fill rate category, the ranking step 218 focuses on ranking the plurality of trading algorithms for only the fill rate category. Similar rankings may be performed for other categories, such as the combination performance and fill rate category. In some embodiments of step 218, the ranking model 166 performs the ranking of the plurality of trading algorithms 130 for the open portion of the candidate order for both the performance and fill rate categories, or for the performance, fill rate and combined categories.

At 220 of the method, when the ranking step 218 produces a highest ranked trading algorithm that is different from the selected trading algorithm 130 used to initially place the candidate order, the user is notified of the new highest ranked trading algorithm for the one or more corresponding categories. Any suitable notification may be used. In some embodiments, the notification provided in step 220 is presented on a GUI 222, such as illustrated by the exemplary GUIs 142 shown in FIGS. 7A and 7B. In some embodiments, the GUI 222 is presented on a display device 122 of the system 100, such as one of the client devices 102, for example.

In some embodiments, the course correction GUI 222 includes one or more elements 224 relating to the characteristics 146 of the open portion of the candidate order, an element 226 identifying the security of the open portion of the candidate order, an element 228 indicating the current trading algorithm 130 that was used to initially place the candidate order, an element 230 indicating the category (e.g., performance, fill rate, combination performance and fill rate, etc.) corresponding to the current trading algorithm 130, and/or other elements.

In some embodiments, the course correction GUI 222 identifies at least one new highest ranked trading algorithm 130 and its corresponding category that was determined in steps 216 and 218 of the method. For example, the course correction GUI 142 shown in FIG. 7A identifies "ALGORITHM X" as being the new highest ranked trading algorithm for the performance category, and "ALGORITHM Y" as being the new highest ranked trading algorithm for the fill rate category. Similarly, the course correction GUI 222 shown in FIG. 7B indicates that the highest ranked trading algorithm 130 for the combination performance and fill rate category on the open portion of the candidate order to be "Liquidnet Dark".

Figure 7A:
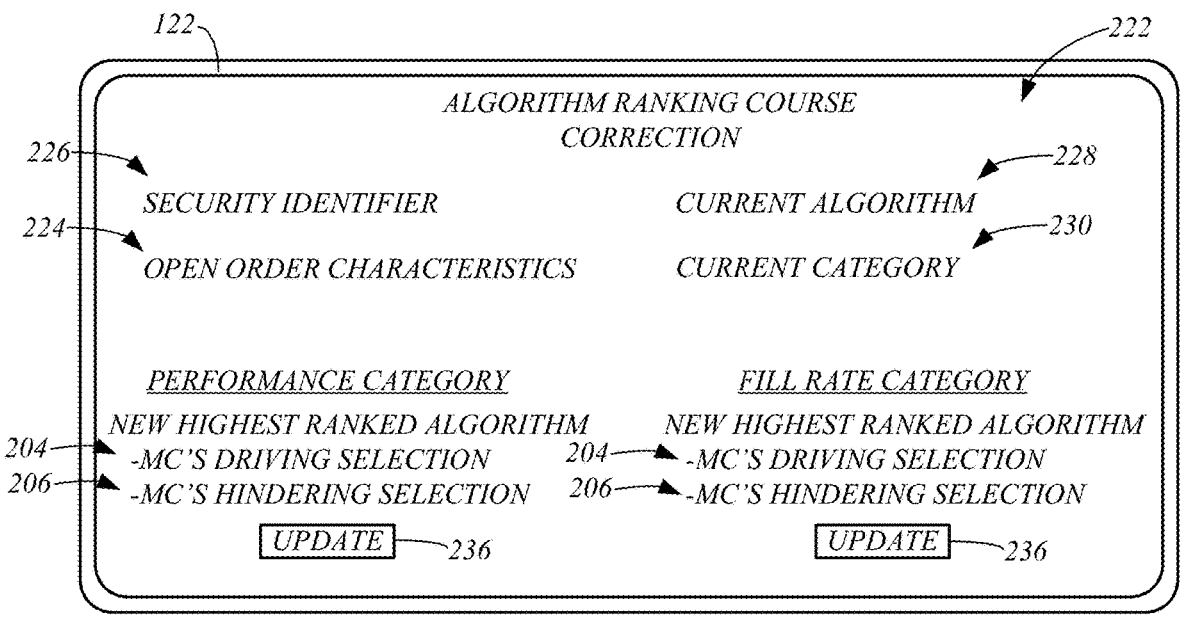
FIGS. 7A and 7B are exemplary graphical user interfaces in accordance with embodiments of the present disclosure.
Figure 7B:
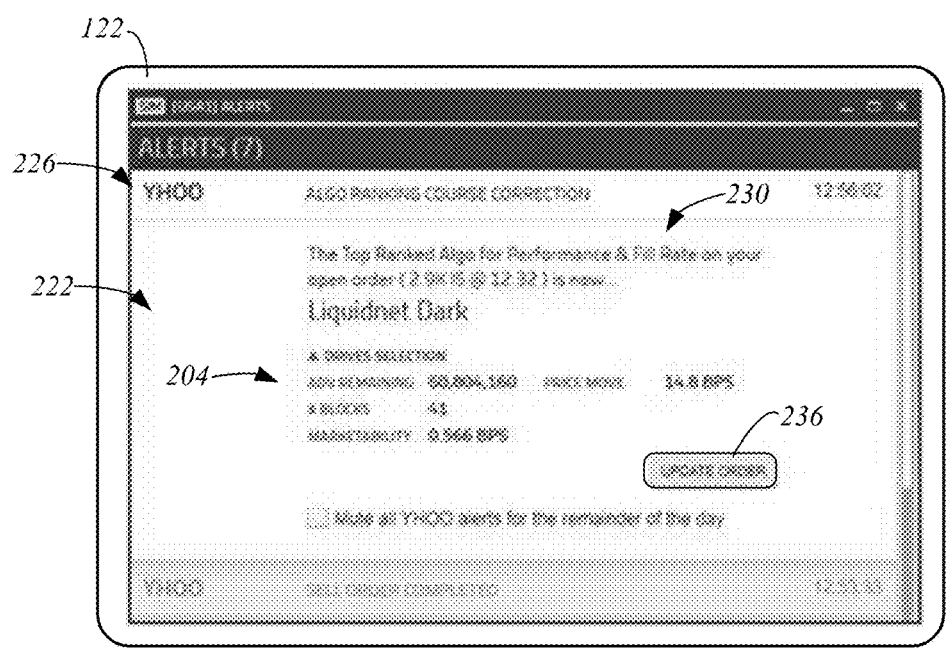

In some embodiments, the course correction GUI 222 also includes similar elements to those presented in the GUIs 142 of FIGS. 5A and 5B, such as a listing of subsets 204 of market characteristics 158 that drove the selection of the new highest ranked trading algorithm 130, as shown in FIGS. 7A and 7B. In some embodiments, the course correction GUI 142 includes elements 206 indicating a subset of the market characteristics 158 that hindered the selection of the new highest ranked trading algorithms 130, as shown in FIG. 7A.

At 234 of the method, a selection of one of the new highest ranked trading algorithms 130 is received by the trading system. In some embodiments, the course correction GUI 222 includes a selectable element 236 corresponding to each of the one or more new highest ranked trading algorithms identified in the course correction GUI 222. The selectable element 236 may be similar to those described above, such as selectable element 154, for example. Selection of the selectable element 236 by the user implements the selection of one of the new highest ranked trading algorithms 130. At 238 of the method, the open portion of the candidate order is placed or executed using the selected new highest ranked trading algorithm 130. Additionally, in some embodiments, the original candidate order is canceled. Still further, in some embodiments, the open portion of the candidate order is automatically placed and/or executed using the new highest ranked trading algorithm 130 without further user input.

The following is an exemplary implementation of steps of the method of FIG. 3 described above, in accordance with embodiments of the present disclosure. In this example, a sample candidate order to trade a stock IBM is entered through the GUI 142 by a user by entering the candidate order characteristics 146 corresponding to items 1-5 and 17 provided below. Element 17 defines the selected algorithm 130, the venue type, and algorithm parameters. Elements 6-16 relate to the current market characteristics 158.

1. Stock name: IBM
2. Side of trade: Buy
3. Target Shares to be traded by algorithm: 1,000 shares
4. Stock's Midpoint Price at start of trade (or current): 164.01
5. Price Limit: 164.05
6. tgtMultiplier: 1/(1-fracVolT), where fracVolT=fraction (average volume from 9:30 AM to current time T)/ADV. "tgtMultiplier" represents the value with which one would have to multiply the target % shares (item 8 below) to obtain the target shares in terms of PERCENTAGE OF THE REMAINING DAY'S AVERAGE VOLUME, a more realistic measure of an order's available liquidity. fracVolT is obtained by adding the elements of the 10-minute discretized u-shape vector below from the first element until time T's corresponding bin. We use: uShape=[0.046998, 0.044641, 0.042297, 0.039977, 0.03769, 0.035445, 0.033253, 0.031122, 0.02906 3, 0.027084, 0.025196, 0.023408, 0.02173, 0.020171, 0.01874, 0.017448, 0.016303, 0.015316, 0.014496, 0.013853, 0.013396, 0.013134, 0.013078, 0.013236, 0.013619, 0.014236, 0.015096, 0.01621, 0.017586, 0.019234, 0.021165, 0.023386, 0.025909, 0.028742, 0.031895, 0.035378, 0 0.0392, 0.043371, 0.0479]. Remark: In order to avoid extreme values for tgtMultiplier, we truncate the calculation of fracVolT at 0.2 from below and at 0.6 from above.
7. ADV20: 20-Day Average Daily Volume: 6,104,000
8. Target Shares, expressed as a percentage of ADV20: 5 (meaning 5%, or 0.05—so we use the actual fraction value multiplied by 100).
9. Stock's Beta: 0.2
10. Stock's 30-Day Daily Close-To-Close Volatility: 0.016
11. Stock's 5-Day Average Spread ($/share): 0.02
12. Stock's 5-Day Average Spread (basis points): 1.52
13. Real-Time Ratio of Dark/Total Volume (from 9:30 am to current time): 0.38. If current time is earlier than 10:00 am, use 5-day historical average.

14. Real-Time Number of Block Trades (from 9:30 am to current time): 5. Number of Block trades from 9:30 am to current time.

15. Price 5 minutes before arrival time: 164.03. If current time is earlier than 9:35 am, use open price.

16. Time of day: 10:30 AM.

17. Parameter values:
   a. BARRACUDA: 0, 7
   b. DARK CONDITIONAL: NONE
   c. IMPLEMENTATION SHORTFALL: 3
   d. PARTICIPATION: 5, 10, 15, 20;
   e. STEALTH: 5

In some embodiments, the ranking model 166 assumes that its input variables fall within the same ranges as that seen in the data used to estimate the model's coefficients 180 and 182. Outside those ranges, the estimates may lose some of their tested accuracy. In this example, the identifiers "BARRACUDA, DARK CONDITIONAL, STEALTH, etc." noted above are examples of names that may be provided to individual trading algorithms 130. Below are exemplary ranges within which the user-defined input variables are assumed to fall:

Limit Price: within −30 and 100 basis points from the midpoint price. For buy orders, a negative value above describes a price above the midpoint price and a positive value describes a price below the midpoint price. The opposite applies to sell orders.

Target shares: less than 30% of ADV20

Maximum time of day when estimates are reliable: until 3:30 PM

Sample outputs (for each order):

1. Name of best predicted basis point (BP) performing algorithm for each order. Note: "BP performance"=difference between average execution price and a weighted average combination of four benchmarks (35% arrival SELL BID/BUY ASK, 17.5% Interval VWAP, 17.5% Last+5 Min Price, 30% PWP20): "Dark Conditional"

2. Predicted BP performance of algorithm in (1) above: 3 BP

3. Predicted Fill Rate of algorithm in (1) above: 30%

4. Name of best predicted Fill Rate performing algorithm for each order: "Implementation Shortfall—Parameter 10"

5. Predicted BP performance of algorithm in (4) above: −5 BP

6. Predicted Fill Rate of algorithm in (4) above: 90%

7. Name of best predicted BP and Fill Rate combination (more on that below) performing algorithm for each order. "Participation Rate—Parameter 5"

8. Predicted BP performance of algorithm in 4) above: 1 BP

9. Predicted Fill Rate of algorithm in (7) above: 75%

10. Marginal Contribution to Fill Rate of Order's Characteristics: For each combination of the order variables (tgtMultiplier, Volatility, Beta, Price Limit, Spread, Dark Volume/Total Volume, Block Trades, Price 5-Minutes Prior to Trade, and Algorithm Parameter), a number (in %, between −100% and 100%), describing the influence (positive if good, negative if bad) on the final BP performance for the algorithm in item (7). See below explanations on how this influence is calculated.

11. Marginal Contribution to BP Score of Order's Characteristics: For each combination of the order variables (tgtMultiplier, Volatility, Beta, Price Limit, Spread, Dark Volume/Total Volume, Block Trades, Price 5-Minutes Prior to Trade, and Algorithm Parameter), a number (in %, between −100% and 100%), describing the influence (positive if good, negative if bad) on the final Fill Rate performance for the algorithm in item (7). See below explanations on how this influence is calculated.

Additional detail concerning a calculation process according to specific preferred embodiments is provided below. The set of input variables varies slightly with the algorithm being evaluated. Below we show, for each algorithm and predicted performance (BP performance or Fill Rate), which variables are used to calculate that performance. The following exemplary variables may be common to all algorithms/strategies:

For all strategies and each of the two performances predicted, the following order variables may be present as inputs for the prediction module:

tgtMultiplier: 1/(1−fracVolT), where fracVolT=fraction (average volume from 9:30 AM to current time T)/ADV. fracVolT represents the value with which one would have to multiply the target % shares to obtain the target shares in terms of PERCENTAGE OF THE REMAINING DAY'S AVERAGE VOLUME, a more realistic measure of order's available liquidity. Remark: In order to avoid extreme values for tgtMultiplier, we truncate the calculation of fracVolT at 0.2 from below and at 0.6 from above.

volCloseClose: Stock's 30-Day Daily Close-To-Close Volatility, as a fraction of the close price.

betaCloseClose: Stock's Beta.

Bps: Stock's 5-Day Average Spread (basis points).

LIMIT_PRICE_bps: Price limit, in basis points, as shown in item 1.1.

DV_VALUE: Ratio of Dark/Total Volume from 9:30 AM to current time.

log BT: Natural logarithm of [(1/fracVolT)×(the Number of Block Trades Per Day from 9:30 AM to current time) or of 0.0001, whichever is greater.

dPbefore: Arrival Price—Price 5 minutes before arrival time, in basis points (corrected for buy/sell, divided by arrival price) and divided by the historical daily volatility (BP).

The following are exemplary variables whose presence or calculation may depend on which algorithm or performance criterion is being predicted:

Percentage of ADV or its base-10 logarithm

For Performance predicted==BP Score and algorithm==Stealth
  use the variable TGTADV20=target number of shares to be traded by algorithm divided by ADV20 (20-Day Average Daily Volume);

Otherwise,
  use the variable log10TGT=base-10 logarithm of TGTADV20 or of 0.0001, whichever is greater;

For all strategies, except Dark Conditional,
  Use PARM=strategy parameter.
  Only Dark Conditional takes no parameter.

TABLE 1

DIFFERENCE BETWEEN DISPLAY AND INPUT VARIABLES

| Display Variable | Calculation for Display | Calculation for Input to Model | Contribution Mapping to Input Variable |
|---|---|---|---|
| ADV Remaining | =ADV20/ tgtMultiplier Actual. No capping | tgtMultiplier = 1/1− fracVolumeUntilT. Cap fracVolumeUntilT at min = 0.2 and max = 0.6 | tgtMultiplier |

TABLE 1-continued

DIFFERENCE BETWEEN DISPLAY AND INPUT VARIABLES

| Display Variable | Calculation for Display | Calculation for Input to Model | Contribution Mapping to Input Variable |
|---|---|---|---|
| % ADV Remaining | =Target Shares/ADV Remaining | via tgtMultiplier and TGTADV20 | TGTADV20 (% ADV) |
| % Dark Vol | Historical before 9:30, Realtime otherwise | DV_VALUE use historical value before 10:00, Realtime otherwise | DV_VALUE |
| # of Block trades | Historical before 9:30, Realtime otherwise | BT_VALUE adjusted using fracVolumeUntilT by taking log and capping small values | BT_VALUE |
| Others | Same for input and order/contribution display | | |

The following is an example of a calculation of Predicted BP or Performance Score and Predicted Fill Rate Score according to an exemplary embodiment of the present disclosure. It should be noted that in this example the dataset (historical data 168) used is comprised of limit orders only, with their limit price ranging from −30 BP to 100 BP from the mid-point price. When fitting and analyzing the model, however, the variables may present different relationships and behaviors for limit prices below and limit prices above an approximate cutoff point of 40 BP. As a consequence, in some embodiments, for each algorithm, two different sets of values are used for the coefficient matrix B and mid-point vector μ: one for limit prices below or at 40 BP and another for limit prices above 40 BP. Thus, the exemplary calculations provided below can be interpreted the same for all cases, except with different model coefficient values below and above 40 BP.

In addition, in some embodiments, an "intermediate" calculation for limit prices between 30 BP AND 40 BP is used. The steps of this "intermediate" calculation are explained below.

If we call Y the BP Score or Fill Value for the order being analyzed, the Matlab-coded expressions which yield each order's prediction $\hat{Y}$ for its Y value are:

piTest=mnrval($B$,table2array(OrdersOut(:,varRegress)),'model','nominal');

$\hat{Y}$=piTest*(midPoints');

The following are examples of calculations of Predicted BP Score (i.e., performance score 162) and Predicted Fill Rate (i.e., fill rate score 164), on a step-by-step basis:

Step 1: Expressing Input and Output Quantities in Terms of Symbols, Vectors and Matrices Step 1.1: Order Characteristics Vector X:

In our framework, an order's characteristics $x_1, x_2, \ldots, x_p$, as outlined in section 1, determine our predictions.

For instance, for a BP score prediction for Barracuda (a type of algorithm), we would have, using the notation from 3.1:

p=10,
Y=order's predicted BP Score if executed with Barracuda,
$x_1$=log 10TGT, $x_2$=6. tgtMultiplier, $x_3$=volCloseClose, $x_4$=betaCloseClose, $x_5$=Bps, $x_6$=LIMIT_PRICE_bps, $x_7$=DV, $x_8$=log BT, $x_9$=dPbefore and, finally, $x_{10}$=PARM, Let us gather those characteristics in a vector X, such that $$X = \begin{bmatrix} x_1 \\ x_2 \\ x_3 \\ \vdots \\ x_{p-2} \\ x_{p-1} \\ x_p \end{bmatrix}$$

Step 1.2: Multinomial Distribution Coefficient Matrix B and Bin Midpoint Vector μ:

Because we are using a multinomial model for both Y=BP Score and Y=Fill Rate predictions, we use k bins (in our case, k=10) to which Y could belong. For each algorithm 130, we will need a multinomial coefficient matrix $B_{kXp}$ and a midpoint vector $\mu_{kX1}$, both pre-estimated from the in-sample data. So each algorithm 130 has its own multinomial coefficient matrix B and midpoint vector μ as follows:

$$B = \begin{bmatrix} \beta_{11} & \beta_{12} & \ldots & \beta_{1p} \\ \beta_{21} & \beta_{22} & \ldots & \beta_{2p} \\ \beta_{31} & \beta_{32} & \ldots & \beta_{3p} \\ \vdots & \vdots & \vdots & \vdots \\ \beta_{k-2,1} & \beta_{k-2,2} & \ldots & \beta_{k-2,p} \\ \beta_{k-1,1} & \beta_{k-1,2} & \ldots & \beta_{k-1,p} \\ \beta_{k1} & \beta_{k2} & \ldots & \beta_{kp} \end{bmatrix}$$

$$\mu = \begin{bmatrix} \mu_1 \\ \mu_2 \\ \mu_3 \\ \vdots \\ \mu_{k-2} \\ \mu_{k-1} \\ \mu_k \end{bmatrix}$$

Step 1.3: Example of Coefficient Matrix B and Vector μ:

Example of Values of B and μ for Barracuda, for Limit Prices smaller than 40 BP. Tables representing exemplary Matrix B and Vector μ are provided in FIGS. 8 and 9, respectively.

Step 2: Calculation of Predictions from Order Matrix B and Vectors X and μ:

With B and μ, we can finally calculate, for each trading algorithm 130, the order's prediction $\hat{Y}$ for its Y (BP Score or Fill Rate) performance measure, when traded with this algorithm. The exemplary steps are, in greater detail, as follows:

Step 2.1: Probability $\pi_j(B,X)$ of Each Bin, for this Order Under this Trading Algorithm:

Calculate the probability $\pi_j(B,X)$ that the performance measurement Y for this order, when executed with this trading algorithm, falls into each bin j, j=1, 2, ..., k:

$$\pi_j(B, X) = P(Y \text{ is in } j^{th} \text{ bin}) = \frac{e^{\alpha_j + \sum_{l=1}^{p} \beta_{jl} x_l}}{1 + \sum_{j=1}^{k-1} e^{\alpha_j + \sum_{l=1}^{p} \beta_{jl} x_l}},$$

-continued $$j = 1, 2, \ldots, k-1$$

$$\pi_k(B, X) = P(Y \text{ is in } k^{th} \text{ bin}) = \frac{1}{1 + \sum_{j=1}^{k-1} e^{\alpha_j + \sum_{l=1}^{p} \beta_{jl} x_l}}$$

Step 2.2: Prediction of BP Score or Fill-Rate-Per-Minute $\hat{Y}(B, \mu, X)$ for this Order Under this Trading Algorithm:

Once the bin probabilities $\pi_1, \pi_2, \ldots, \pi_k$ have been obtained, as calculated above, the order's predicted value $\hat{Y}$ for Y can be obtained with the expression:

$$\hat{Y}(B, \mu, X) = \sum_{j=1}^{k} \mu_j \pi_j(B, X)$$

Step 2.3: Special Calculation for Limit Prices Between 30BP and 40 BP:

For limit prices below 30 BP or above 40 BP, the current step is unnecessary. But, in some embodiments, for limit prices above and between 30 BP and 40 BP, the final score and fill values can be adjusted as follows. Calling $B_{under40}$, $\mu_{under40}$ and $B_{over40}$, $\mu_{over40}$ the parameters corresponding respectively to a limit price below or above 40 BP, the final values are, FOR LIMIT PRICES BETWEEN 30 BP AND 40 BP:

$$\hat{Y}(B_{under40}, \mu_{under40}, B_{over40}, \mu_{over40}, X) =$$
$$(1 - \lambda) \cdot \hat{Y}(B_{under40}, \mu_{under40}, X(\text{Limit} = \text{order Limit})) +$$
$$\lambda \cdot \hat{Y}(B_{over40}, \mu_{over40}, X(\text{Limit} = 40\ BP))$$

where $$\lambda = (\text{order Limit} - 30\ BP) / (40\ BP - 30\ BP)$$

Where X(Limit=order Limit) denotes the original order's variable vector X and X(Limit=40 BP) the original order's variable vector X with its Limit Price Value replaced with 40 BP. The rationale behind the adjustment above is the need for the results to be continuous at the 40 BP limit price, even when its coefficients change at 40 BP.

Step 2.4: Subtracting 5 BP from Barracuda's Score BP (for the Case Limit Price >=40 BP) as an Exemplary Correction for Inaccuracies in the Fit:

Once we have calculated, for Barracuda's BP Score (case Limit Price >=40 BP), $\hat{Y}(B_{over40}, \mu_{over40}, X(\text{Limit}>=40$ BP)), we return instead, as Barracuda's "loose limit" BP score, the value $\hat{Y}(B_{over40}, \mu_{over40}, X(\text{Limit}>=40$ BP))−5 BP. This allows for a fair correction of the bias observed in both the in-sample and out-sample BP fit for that strategy.

Step 2.5: Multiply Every Trading Algorithm's Fill-Per-Minute by the Factors Specified in the Table Below to Get Fill Rate's Predicted Values:

Once the FILL-RATE-PER-MINUTE predicted value $\hat{Y}$ has been calculated, the Fill Rate (which will now be different from the displayed Fill Rate) is obtained by multiplying the former by the factor meanDuration (TGTADV20, LIMIT_PRICE_bps), as follows:

Fill Rate=meanDuration(TGTADV20,LIMIT_PRICE_bps)·$\hat{Y}$

This allows a fair conversion from Fill-Rate-Per-Minute to Fill Rate via the average time of exposure of the order (meanDuration). It is assumed that this average time varies mostly with the TGTADV20 and if the LIMIT_PRICE_bps is Tight or Loose. Below is a table that defines the average multiplicative values above:

| TIGHT (LIMIT_PRICE_bps <= 40 BP) TGTADV20 | | | LOOSE (LIMIT_PRICE_bps > 40 BP) TGTADV20 | | |
|---|---|---|---|---|---|
| Lower Bound | Upper Bound | meanDuration | Lower Bound | Upper Bound | meanDuration |
| 0 | 0.1 | 0.7 | 0 | 0.05 | 0.1 |
| 0.1 | 1 | 6.1 | 0.05 | 0.15 | 1.7 |
| 1 | 3 | 10.3 | 0.15 | 0.3 | 4.3 |
| 3 | 5 | 13.9 | 0.3 | 1 | 7.8 |
| 5 | 10 | 15.8 | 1 | infinity | 9.6 |
| 10 | 20 | 18 | | | |
| 20 | 50 | 20.4 | | | |
| 50 | infinity | 25.8 | | | |

After multiplying the Fill-Rate-Per-Minute Y by the appropriate meanDuration (according to table above):
1) Use the resulting product, Fill Rate, for ranking (both Fill and Combo) and marginal contribution calculations;
2) Cap it by 100% to display it to users.

Calculation of Each Order Variable's Marginal Contribution to Predicted Performance (BP Score or Fill)

The following is an example of a calculation of each order variable's marginal contribution to Predicted Performance (BP Score or Fill) according to exemplary embodiments of the present disclosure.

Step 1: Definition of Vector with One Disturbed Value, at the Position of an Order Characteristic, from Mean Values:

Within the in-sample data, the mean value $\bar{x}_l$ of each order variable $l, l=1, 2, \ldots, p$ is calculated. Using the definition of Step 1.1, the mean values being used for vector $\bar{X}$ are:

$\bar{x}_1$=avg(log 10TGT)=1, $\bar{x}_2$=avg(tgtMultiplier)=2, $\bar{x}_3$=avg(volCloseClose)=0.015, $\bar{x}_4$=avg(betaCloseClose)=1.07, $\bar{x}_5$=avg(Bps)=8, $\bar{x}_6$=avg(LIMIT_PRICE_bps)=50, $\bar{x}_7$=avg(DV)=0.3, $\bar{x}_8$=avg(log BT)=1, $\bar{x}_9$=avg(dPbefore)=0 and, $\bar{x}_{10}$=avg(PARM)=5.

By defining the "disturbed in the lth position from mean values" vector $\bar{X}_{\{l\}}$, defined as the vector with all its positions (order characteristics) set at their respective mean values, except for its lth position, which is set at the current order's characteristic's Lth value. Thus:

$$\bar{X}_{\{l\}} = \begin{bmatrix} \bar{x}_1 \\ \bar{x}_2 \\ \vdots \\ \bar{x}_{l-1} \\ x_l \\ \bar{x}_{l+1} \\ \vdots \\ \bar{x}_{k-1} \\ \bar{x}_k \end{bmatrix}$$

Step 2: Calculation of Marginal Contribution Using Disturbed in the $L^{th}$ Position from Mean Values" Vector $\bar{X}_{\{l\}}$:

With the "disturbed in the lth position from mean values" vector $\overline{X}_{\{l\}}$, above, the order's lth characteristic's contribution to the current order's performance value can be calculated as follows:

$$d\hat{Y}_{\{l\}} = \hat{Y}(B,\mu,\overline{X}_{\{l\}}) - \hat{Y}(B,\mu,\overline{X})$$

In order to avoid the possible division by a possibly zero-valued $\hat{Y}(B, \mu, \overline{X})$ or $\hat{Y}(B, \mu, \overline{X}_{\{l\}})$ denominator, we choose to divide the quantity above instead by $$nonZeroDenom = \sum_{l=1}^{k} |d\hat{Y}_{\{l\}}|.$$

Thus, finally the marginal contribution becomes:

$$\text{Marginal Contrib of order's } l^{th} \text{ characteristic} = \frac{d\hat{Y}_{\{l\}}}{\sum_{l=1}^{k} |d\hat{Y}_{\{l\}}|}$$

We have thus calculated above the marginal contribution of order variable 1 to the performance of the order with the analyzed algorithm. For display to traders, use top 3 highest values as 'Drives recommendation' and bottom 3 lowest values as 'Hinders recommendation'.

The following is an example of how one may assign weights to predicted BP Score (i.e., forecasted performance score 180) and predicted Fill Rate (i.e., forecasted fill rate score 182) in order to find the best compromise, according to exemplary embodiments. After finding the predicted BP Score and the predicted Fill Rate for each algorithm 130, as explained above, the top ranking algorithm for each order will be that which maximizes the following utility function (for pre-established non-negative weights $w_{Fill}$ and $w_{BP}$).

Figure 10:
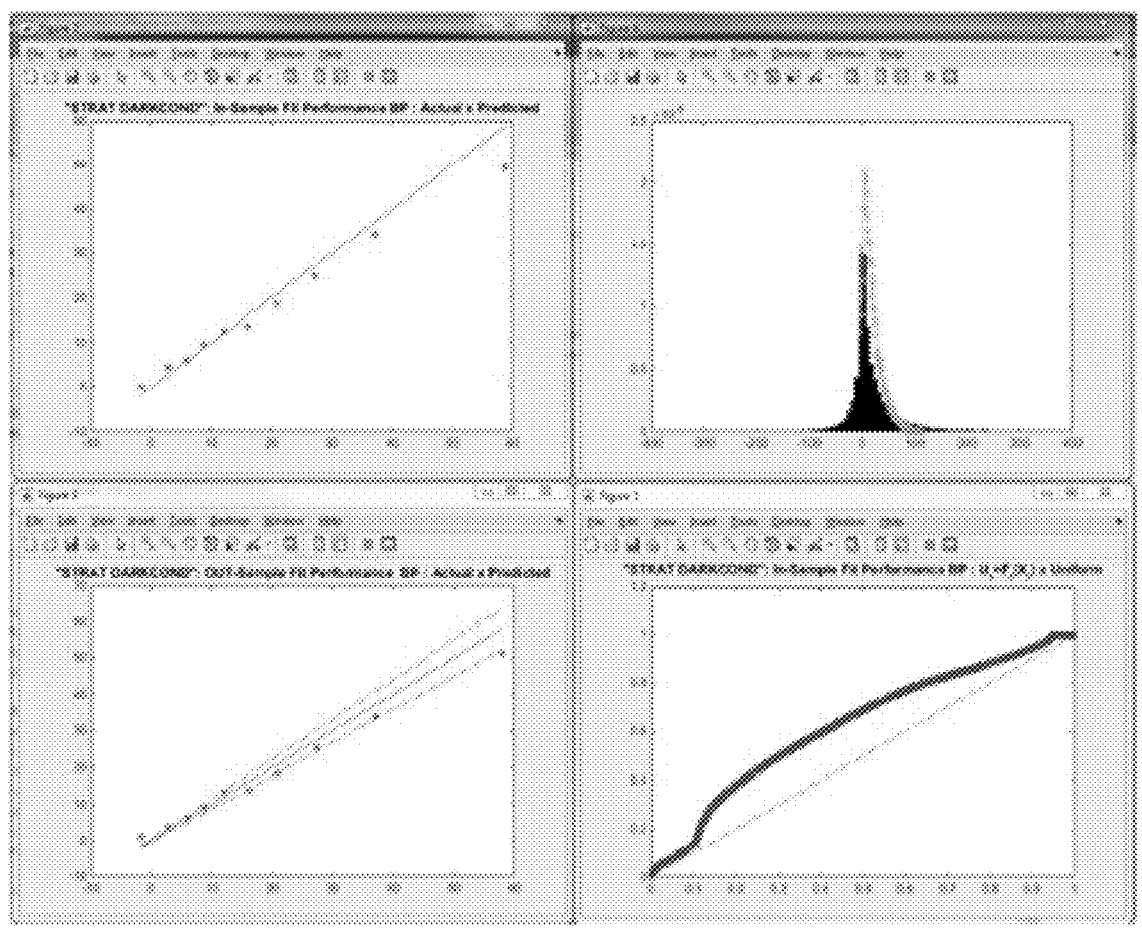
FIGS. 10 and 11 are graphical plots demonstrating the accuracy of an exemplary algorithm ranking model according to certain embodiments of the present disclosure.
Figure 11:
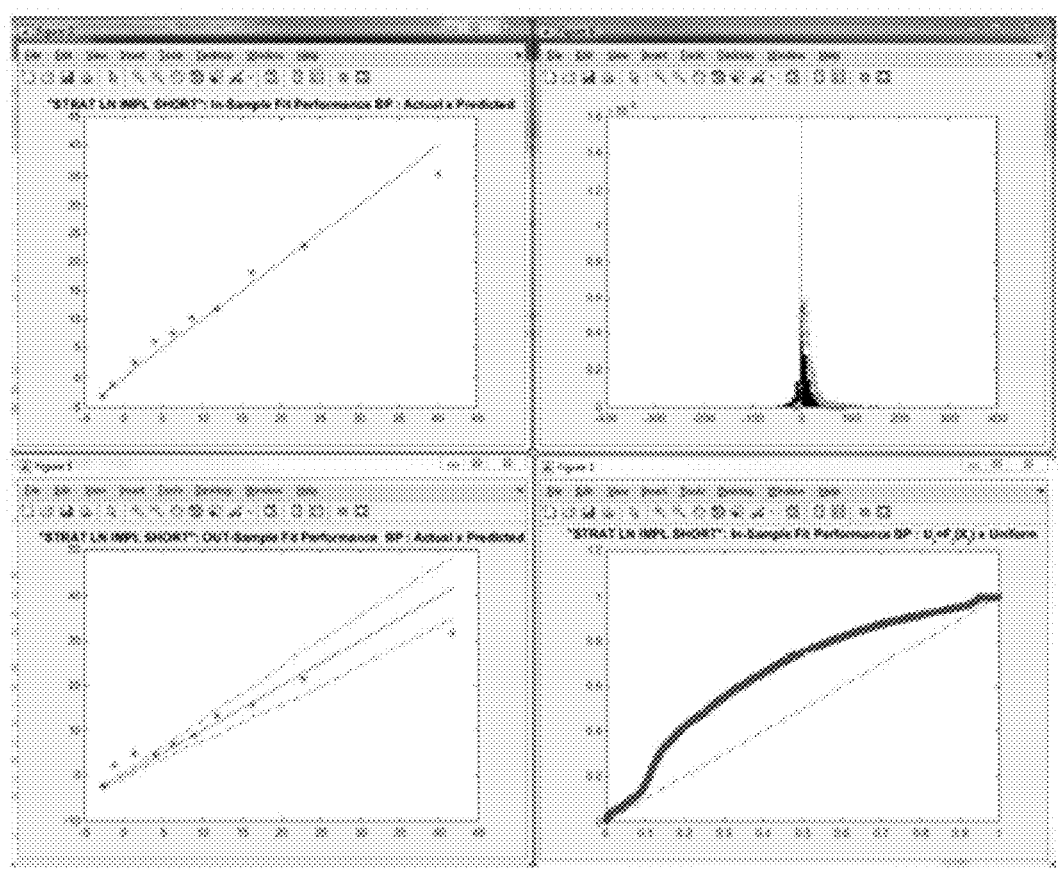

Order's Top Ranked Algo Algo for which $w_{Fill}$·(Predicted Fill)+$w_{BP}$·(Predicted BP) is maximum The exemplary calculations and steps above provide a simple and quick way of predicting, from a candidate order's defining characteristics 146, the performance of various algorithms 130 that may be employed by the system 100 in trading that order. The accuracy of such performance predictions has been high. For example, FIGS. 10 and 11 each show a plot in one axis of the bins which cluster different levels (deciles) of an exemplary model's predicted values for the two performance criteria (BP or Performance Score 180 and Fill Rate Score 182) and the corresponding actual values, averaged over that cluster, defined by the model's predictions prior to actual trading. The fact that those scatter plots of the right lower corner of FIGS. 10 and 11 are very close to the 45-degree line is a strong indication of the accuracy of the model's predictions. But still, as one of skill in the art will appreciate, algorithm ranking methods according to embodiments of the present disclosure provide an average estimate prediction of the actual value of the algorithm performance when trading a given order. So, even though the models described herein are not guaranteed to produce the actual performance value of every candidate order's execution by each trading algorithm, the present methods accurately predict average values for the relevant performance criteria, e.g., BP or performance score 180 and Fill Rate or fill rate score 182.

Although the embodiments of the present disclosure have been described with reference to preferred embodiments, workers skilled in the art will recognize that changes may be made in form and detail without departing from the spirit and scope of the present disclosure.

What is claimed is:

1. A method of placing a security trade order using a trading algorithm in a computerized trading system, the method comprising:

displaying a first graphical user interface (GUI) on a display device of the system;

receiving candidate order characteristics from a user through the first GUI, the candidate order characteristics defining a candidate order for a security;

obtaining current market characteristics associated with the candidate order;

forecasting performance and fill rate scores for executions of the candidate order by each of a plurality of trading algorithms using a ranking model based on historical data for a plurality of orders previously-executed via one or more of the plurality of trading algorithms, the candidate order characteristics and the current market characteristics, wherein the performance score relates to a transaction price obtained for the security by a trading algorithm, and the fill rate score relates to a percentage of completion of the order by a trading algorithm;

ranking each of the plurality of trading algorithms for the candidate order for a performance category based on the forecasted performance score, and a fill rate category based on the forecasted fill rate score, and selecting a highest ranked trading algorithm for each of the performance and fill rate categories, using the ranking model;

displaying the highest ranked trading algorithm for each of the performance and fill rate categories on a second GUI;

identifying first subsets of the current market characteristics that drove the selection of each of the highest ranked trading algorithms by the ranking model; and displaying elements identifying each of the first subsets and an indication that the first subsets drove the selection of each of the highest ranked trading algorithms on the second GUI;

receiving a selection of one of the displayed highest ranked trading algorithms from a user;

placing the candidate order using the selected trading algorithm in response to receiving the selection using the system;

executing the candidate order for a period of time using the selected trading algorithm, wherein at least an open portion of the candidate order has yet to be completed, the open portion having open order characteristics;

obtaining current market characteristics;

forecasting revised performance and fill rate scores for executions of the open portion by each of the plurality of trading algorithms using the ranking model based on the historical data, the open order characteristics and the current market characteristics, ranking each of the plurality of trading algorithms for the open portion for at least one of the revised performance and fill rate scores, and selecting a new highest ranked trading algorithm for at least one of the performance and fill rate categories;

notifying a user when the new highest ranked trading algorithm is different than the selected trading algorithm;

receiving a selection of the new highest ranked trading algorithm from a user; and placing the open portion using the selected new highest ranked trading algorithm using the system.

2. The method according to claim 1, wherein the candidate order characteristics include an identification of the security, a target quantity to be traded, and a limit price for the security.

3. The method according to claim 2, wherein the current market characteristic are selected from the group consisting of a 20-day average daily volume remaining for the security, the target quantity of the candidate order as a percentage of the 20-day average daily volume remaining, a difference between a prevailing price of the security and the limit price of the candidate order, a behavior of the price of the security over a predetermined period, a dark volume as a percentage of total market volume from market opening, a number of blocks of the security traded since market opening, a sensitivity of a return of the security to a return of the market, a 30-day close-to-close price volatility of the security, and a multi-day historical spread for the security that is exponentially weighted with a multi-day half-life.

4. The method according to claim 3, further comprising displaying the candidate order characteristics on the GUI.

5. The method according to claim 4, further comprising displaying the current market characteristics on the GUI.

6. The method according to claim 1, further comprising:
identifying second subsets of the current market characteristics that hindered the selection of each of the highest ranked trading algorithms by the ranking model; and
displaying elements identifying each of the second subsets and an indication that the second subsets hindered the selection of each of the highest ranked trading algorithms on the second GUI.

7. The method according to claim 1, including:
ranking each of the plurality of trading algorithms for a combination performance and fill rate category, which is based on a combination of the forecasted performance and fill rate scores, and selecting a highest ranked trading algorithm for the combination performance and fill rate category; and
displaying the highest ranked trading algorithm for the combination performance and fill rate category on the second GUI.

8. The method according to claim 1, wherein forecasting performance and fill rate scores comprises:
collecting the historical data, the historical data for each of the plurality of orders including:
order characteristics for the order selected from the group consisting of an identification of a security, a target quantity of the security, a limit price for the security, and the trading algorithm and corresponding parameters selected for the order;
market characteristics at the time the order was submitted;
performance data indicating a basis point performance of the order trade performed by the trading algorithm; and
fill rate performance data indicating a fraction of the order's target quantity that was filled by the trading algorithm;
calculating performance and fill rate coefficients based on the historical data using the ranking model; and
forecasting the performance and fill rate scores for the candidate order using the calculated performance and fill rate coefficients.

9. The method according to claim 8, wherein the current market characteristics include at least one current market characteristic selected from the group consisting of a 20-day average daily volume remaining, the target quantity of the candidate order as a percentage of the 20-day average daily volume remaining, a difference between a prevailing price of the security and a limit price of the candidate order, a behavior of the price of the security over a predetermined period, a dark volume as a percentage of total market volume from market opening, a number of blocks of the security traded since market opening, a sensitivity of a return of the security to a return of the market, a 30-day close-to-close price volatility of the security, and a multi-day historical spread for the security that is exponentially weighted with a multi-day half-life.

10. The method according to claim 9, wherein calculating performance and fill rate coefficients comprises fitting multinomial regressions to express the performance and fill rate scores of the candidate order as a function of the order and market characteristics of the candidate order.

11. The method according to claim 8, wherein:
the method includes receiving a trader conviction input from the user using the first GUI, the trader conviction input indicating a bullish, neutral, or bearish conviction regarding the candidate order; and
forecasting performance and fill rate scores comprises forecasting performance and fill rate scores for executions of the candidate order by each of the plurality of trading algorithms based on the trader conviction input.

12. A computerized trading system comprising:
a display device; and
one or more processors programmed to generate a graphical user interface (GUI) on the display device, the GUI comprising:
one or more elements relating to candidate order characteristics of a candidate order of a security;
one or more elements identifying one or more highest ranked trading algorithms selected from a plurality of available trading algorithms using a ranking model of the system, the highest ranked trading algorithms selected from the group consisting of a highest ranked performance trading algorithm that is predicted by the ranking model to achieve a high performance score for the candidate order, and a highest ranked fill rate trading algorithm that is predicted by the ranking model to achieve a high fill rate score for the candidate order, wherein the performance score relates to a transaction price obtained for the security by a trading algorithm, and the fill rate score relates to a percentage of completion of the order by a trading algorithm; and
selectable elements corresponding to each of the highest ranked trading algorithms, wherein the system is configured to commence execution of the candidate order upon selection of a selectable element by a user using the corresponding trading algorithm;
wherein, for each of the elements identifying one of the highest ranked trading algorithms, the GUI includes one or more elements identifying a first subset of current market characteristics that drove the selection of the highest ranked trading algorithm.

13. The computerized trading system according to claim 12, wherein the highest ranked trading algorithms include a highest ranked combination trading algorithm that is predicted by the ranking model to achieve a high combined performance score and fill rate score for the candidate order.

14. The computerized trading system according to claim 12, wherein the candidate order characteristics are selected from the group consisting of an identification of the security, a target quantity to be traded, and a limit price for the security.

15. The computerized trading system according to claim 14, wherein the GUI includes elements relating to at least one current market characteristics selected from the group consisting of a 20-day average daily volume remaining for the security, the target quantity of the candidate order as a percentage of the 20-day average daily volume remaining, a difference between a prevailing price of the security and the limit price of the candidate order, a behavior of the price of the security over a predetermined period, a dark volume as a percentage of total market volume from market opening, a number of blocks of the security traded since market opening, a sensitivity of a return of the security to a return of the market, a 30-day close-to-close price volatility of the security, and a multi-day historical spread for the security that is exponentially weighted with a multi-day half-life.

16. The computerized trading system according to claim 12, wherein, for each of the elements identifying one of the highest ranked trading algorithms, the GUI includes one or more elements identifying a second subset of current market characteristics that hindered the selection of the highest ranked trading algorithm.

17. The computerized trading system according to claim 16, wherein the ranking model is configured to:
   collect historical data for a plurality of trading orders executed via one or more of the plurality of trading algorithms, the historical data for each order including:
      order characteristics for the order selected from the group consisting of an identification of a security, a target quantity of the security, a limit price for the security;
      order market characteristics at the time the order was submitted, and the trading algorithms and corresponding parameters selected for the order;
      performance data indicating a basis point performance of the order trade performed by the trading algorithm; and
      fill rate performance data indicating a fraction of the order's target quantity that was filled by the trading algorithm;
   calculate performance and fill rate coefficients based on the historical data using the ranking model; and
   forecast the performance and fill rate scores for the candidate order using the calculated performance and fill rate coefficients.

18. A computerized trading system comprising one or more processors programmed to:
   display a first graphical user interface (GUI) on a display of the system;
   receive candidate order characteristics that define a candidate order for a security through the first GUI;
   obtain current market characteristics associated with the candidate order;
   forecast performance and fill rate scores for executions of the candidate order by each of a plurality of trading algorithms using a ranking model based on historical data for a plurality of orders previously-executed via one or more of the plurality of trading algorithms, the candidate order characteristics and the current market characteristics, wherein the performance score relates to a transaction price obtained for the security by a trading algorithm, and the fill rate score relates to a percentage of completion of the order by a trading algorithm;
   rank each of the plurality of trading algorithms for the candidate order for a performance category based on the forecasted performance score, and a fill rate category based on the forecasted fill rate score, and select a highest ranked trading algorithm for each of the performance and fill rate categories, using the ranking model;
   display the highest ranked trading algorithm for each of the performance and fill rate categories on a second GUI;
   identify first subsets of the current market characteristics that drove the selection of each of the highest ranked trading algorithms by the ranking model;
   display elements identifying each of the first subsets and an indication that the first subsets drove the selection of each of the highest ranked trading algorithms on the second GUI;
   receive a selection of one of the displayed highest ranked trading algorithms from a user;
   place the candidate order using the selected trading algorithm in response to receiving the selection using the system
   execute the candidate order for a period of time using the selected trading algorithm, wherein at least an open portion of the candidate order has yet to be completed, the open portion having open order characteristics;
   obtain current market characteristics;
   forecast revised performance and fill rate scores for executions of the open portion by each of the plurality of trading algorithms using the ranking model based on the historical data, the open order characteristics and the current market characteristics;
   rank each of the plurality of trading algorithms for the open portion for at least one of the revised performance and fill rate scores, and selecting a new highest ranked trading algorithm for at least one of the performance and till rate categories;
   notify a user when the new highest ranked trading algorithm is different than the selected trading algorithm;
   receive a selection of the new highest ranked trading algorithm from a user; and
   place the open portion using the selected new highest ranked trading algorithm using the system.

* * * * *